US009462210B2

(12) United States Patent  
Dagit, III

(10) Patent No.: US 9,462,210 B2  
(45) Date of Patent: Oct. 4, 2016

(54) METHOD AND SYSTEM FOR USER INTERFACE FOR INTERACTIVE DEVICES USING A MOBILE DEVICE

(71) Applicant: Remote TelePointer, LLC, Radnor, PA (US)

(72) Inventor: Charles E. Dagit, III, Radnor, PA (US)

(73) Assignee: Remote Telepointer, LLC, Radnor, PA (US)

( * ) Notice: Subject to any disclaimer, the term of this patent is extended or adjusted under 35 U.S.C. 154(b) by 546 days.

(21) Appl. No.: 13/669,190

(22) Filed: Nov. 5, 2012

(65) Prior Publication Data

US 2013/0113993 A1     May 9, 2013

Related U.S. Application Data

(60) Provisional application No. 61/555,989, filed on Nov. 4, 2011.

(51) Int. Cl.
    *H04M 3/00*     (2006.01)
    *H04N 5/44*     (2011.01)
    (Continued)

(52) U.S. Cl.
    CPC .............. *H04N 5/4403* (2013.01); *G01S 19/49* (2013.01); *G06F 3/017* (2013.01);
    (Continued)

(58) Field of Classification Search
    CPC ......... H04M 1/6091; H04M 1/72577; H04M 2250/10; H04M 2250/12; H04W 12/08; H04W 4/008; H04W 4/046; H04W 4/14; H04W 64/003; H04W 64/006; H04W 8/18
    USPC .............. 455/41.1, 410, 411, 557, 39, 556.1, 455/420, 456.1, 456.3, 414.2, 67.11, 414.1, 455/427
    See application file for complete search history.

(56) References Cited

U.S. PATENT DOCUMENTS

| | | |
|---|---|---|
| 5,554,980 A | 9/1996 | Hashimoto et al. |
| 5,926,168 A | 7/1999 | Fan |

(Continued)

FOREIGN PATENT DOCUMENTS

| | | |
|---|---|---|
| CN | 101853568 | 10/2010 |
| CN | 201828670 | 5/2011 |

(Continued)

OTHER PUBLICATIONS

International Search Report and Written Opinion mailed Jan. 23, 2013 for corresponding International Application No. PCT/US2012/063596.

(Continued)

*Primary Examiner* — Joseph Arevalo  
(74) *Attorney, Agent, or Firm* — Pepper Hamilton LLP

(57) ABSTRACT

A software application and system that enables point-and-click interaction with a TV screen. The application determines geocode positioning information for a handheld device, and uses that data to create a virtual pointer for a television display or interactive device. Some embodiments utilize motion sensing and touchscreen input for gesture recognition interacting with video content or interactive device. Motion sensing can be coupled with positioning or localization techniques the user to calibrate the location of the interactive devices and the user location to establish and maintain virtual pointer connection relationships. The system may utilize wireless network infrastructure and cloud-based calculation and storage of position and orientation values to enable the handheld device in the TV viewing area to replace or surpass the functionality of the traditional TV remote control, and also interface directly with visual feedback on the TV screen.

29 Claims, 15 Drawing Sheets

(51) Int. Cl.
| | |
|---|---|
| *H04N 21/41* | (2011.01) |
| *G01S 19/49* | (2010.01) |
| *G06F 3/01* | (2006.01) |
| *H04N 21/422* | (2011.01) |
| *H04N 21/472* | (2011.01) |
| *H04N 21/485* | (2011.01) |
| *G01S 5/00* | (2006.01) |
| *G01S 5/02* | (2010.01) |
| *H04M 1/725* | (2006.01) |

(52) U.S. Cl.
CPC ... *H04N 21/4126* (2013.01); *H04N 21/42222* (2013.01); *H04N 21/42224* (2013.01); *G01S 5/0027* (2013.01); *G01S 5/02* (2013.01); *H04M 1/7253* (2013.01); *H04M 1/72533* (2013.01); *H04N 21/4131* (2013.01); *H04N 21/42214* (2013.01); *H04N 21/47217* (2013.01); *H04N 21/485* (2013.01)

(56) References Cited

U.S. PATENT DOCUMENTS

| | | | |
|---|---|---|---|
| 6,067,046 A | 5/2000 | Nichols | |
| 6,081,255 A | 6/2000 | Narabu | |
| 6,297,804 B1 | 10/2001 | Kashitani | |
| 6,311,075 B1* | 10/2001 | Bevan et al. | 455/562.1 |
| 6,411,277 B1 | 6/2002 | Shah-Nazaroff | |
| 6,504,526 B1 | 1/2003 | Mauritz | |
| 7,030,856 B2 | 4/2006 | Dawson et al. | |
| 7,102,616 B1 | 9/2006 | Sleator | |
| 7,489,298 B2 | 2/2009 | Liberty et al. | |
| 7,496,445 B2 | 2/2009 | Mohsini | |
| 7,616,152 B2 | 11/2009 | Terada et al. | |
| 7,652,627 B2 | 1/2010 | Choi | |
| 7,679,601 B2 | 3/2010 | Chang et al. | |
| 7,746,321 B2 | 6/2010 | Banning | |
| 7,756,297 B2 | 7/2010 | Pryor | |
| 7,774,155 B2 | 8/2010 | Sato et al. | |
| 7,907,838 B2 | 3/2011 | Nasiri et al. | |
| 7,942,745 B2 | 5/2011 | Ikeda et al. | |
| 8,155,673 B2 | 4/2012 | Alizadeh-Shabdiz et al. | |
| 8,166,421 B2 | 4/2012 | Magal et al. | |
| 8,230,075 B1* | 7/2012 | Weskamp et al. | 709/227 |
| 8,239,784 B2 | 8/2012 | Hotelling et al. | |
| 8,279,840 B2 | 10/2012 | Walker | |
| 8,320,939 B1 | 11/2012 | Vincent | |
| 8,348,760 B2 | 1/2013 | Mao | |
| 8,390,821 B2 | 3/2013 | Shpunt et al. | |
| 8,433,244 B2 | 4/2013 | Liu | |
| 8,487,881 B2 | 7/2013 | Keenan | |
| 8,565,791 B1* | 10/2013 | Schilit | H04W 64/00 455/41.1 |
| 8,583,400 B2 | 11/2013 | Thrun et al. | |
| 8,626,198 B2 | 1/2014 | Das et al. | |
| 8,700,316 B2 | 4/2014 | Su et al. | |
| 8,706,137 B2 | 4/2014 | Sridhara et al. | |
| 8,773,523 B2 | 7/2014 | Chiu | |
| 8,774,837 B2 | 7/2014 | Wright | |
| 8,805,418 B2 | 8/2014 | Nichols | |
| 8,816,903 B2 | 8/2014 | Sengupta et al. | |
| 8,838,376 B2 | 9/2014 | Garin et al. | |
| 8,872,762 B2 | 10/2014 | Galor et al. | |
| 8,933,876 B2 | 1/2015 | Galor et al. | |
| 9,066,129 B2 | 6/2015 | Connelly et al. | |
| 9,142,051 B2 | 9/2015 | Kwak | |
| 9,215,293 B2 | 12/2015 | Miller | |
| 2002/0036617 A1* | 3/2002 | Pryor | G06F 3/042 345/156 |
| 2004/0106379 A1* | 6/2004 | Zen | H04W 48/20 455/67.11 |
| 2004/0204842 A1* | 10/2004 | Shinozaki | G01C 21/3682 701/533 |
| 2006/0026521 A1 | 2/2006 | Hotelling et al. | |
| 2006/0287085 A1* | 12/2006 | Mao et al. | 463/37 |
| 2008/0170033 A1 | 7/2008 | Schultz | |
| 2008/0278445 A1* | 11/2008 | Sweetser et al. | 345/158 |
| 2008/0284645 A1* | 11/2008 | Terada | G01S 19/04 342/357.34 |
| 2008/0318682 A1* | 12/2008 | Rofougaran et al. | 463/39 |
| 2009/0102800 A1 | 4/2009 | Keenan | |
| 2009/0153288 A1 | 6/2009 | Hope | |
| 2009/0153289 A1 | 6/2009 | Hope et al. | |
| 2009/0303204 A1* | 12/2009 | Nasiri et al. | 345/184 |
| 2009/0315776 A1 | 12/2009 | Khosravy et al. | |
| 2009/0319175 A1 | 12/2009 | Khosravy et al. | |
| 2010/0060569 A1 | 3/2010 | Shamilian | |
| 2010/0069115 A1 | 3/2010 | Liu | |
| 2010/0238137 A1 | 9/2010 | Han et al. | |
| 2010/0333043 A1* | 12/2010 | Faris et al. | 715/863 |
| 2011/0045770 A1 | 2/2011 | Nguyen | |
| 2011/0187591 A1 | 8/2011 | Walker, Sr. | |
| 2011/0195782 A1 | 8/2011 | Mao et al. | |
| 2012/0058783 A1* | 3/2012 | Kim et al. | 455/456.2 |
| 2012/0071151 A1* | 3/2012 | Abramson et al. | 455/418 |
| 2012/0105720 A1* | 5/2012 | Chung et al. | 348/468 |
| 2012/0204133 A1 | 8/2012 | Guendelman et al. | |
| 2012/0249831 A1* | 10/2012 | Porter | 348/231.3 |
| 2012/0250980 A1* | 10/2012 | Gillard et al. | 382/154 |
| 2012/0256959 A1* | 10/2012 | Ye et al. | 345/649 |
| 2012/0265528 A1* | 10/2012 | Gruber et al. | 704/235 |
| 2012/0270654 A1* | 10/2012 | Padovani et al. | 463/36 |
| 2012/0302287 A1* | 11/2012 | Wright | G08G 1/0965 455/556.1 |
| 2012/0303264 A1* | 11/2012 | Su et al. | 701/416 |
| 2012/0309371 A1* | 12/2012 | Yamada | H04W 88/08 455/414.2 |
| 2013/0035110 A1* | 2/2013 | Sridhara | H04W 4/021 455/456.1 |
| 2013/0065648 A1* | 3/2013 | Kim et al. | 455/566 |
| 2013/0069969 A1* | 3/2013 | Chang et al. | 345/589 |
| 2013/0084981 A1* | 4/2013 | Zalewski et al. | 463/36 |
| 2013/0125027 A1 | 5/2013 | Abovitz | |
| 2013/0151195 A1* | 6/2013 | Marinoni | 702/151 |
| 2013/0238455 A1* | 9/2013 | Laracey | 705/21 |
| 2014/0118254 A1* | 5/2014 | Fei et al. | 345/157 |
| 2014/0125575 A1* | 5/2014 | Samanta Singhar | 345/156 |
| 2014/0125592 A1 | 5/2014 | Nayak | |
| 2014/0254575 A1* | 9/2014 | Venkatraman et al. | 370/338 |

FOREIGN PATENT DOCUMENTS

| | | |
|---|---|---|
| CN | 202133771 | 2/2012 |
| EP | 2327270 | 6/2000 |
| EP | 2441279 | 4/2012 |
| TW | 538640 | 6/2003 |
| WO | 00/78050 | 12/2000 |

OTHER PUBLICATIONS

Schwalowsky, Stefan, et al. "System integration of an IEEE 802.11 based TDoA localization system." Precision Clock Synchronization for Measurement Control and Communication (ISPCS), 2010 International IEEE Symposium on. IEEE, 2010.

Westermann, "I'm Home: Smartphone-enabled Gestural Interaction with Multi-Modal Smart-Home Systems," https://tilowestermann.eu, http://tilowestermann.eu/download/Diplomarbeit.pdf (accessed May 25, 2011).

Kim et al. "An interaction and product design of gesture based TV remote control," CHI '04 Extended Abstracts on Human Factors in Computing Systems, pp. 1548-1548; ACM New York, NY, USA.

* cited by examiner

FIG.15

RTSM Algorithm
(Real-Time Serial Multilateration)

- 550 Initiate
- 653 DGPS corrected +/or ToA refined AGPS — dddmm.mmmmm +/- 5m
- 656 High-Res Geocode Format Conversion — Lat: ddmm.mmmmmm; Long: dddmm.mmmmmm; Alt: m.mmm (above mean sea); Elev: m.mmm (to geoid centroid)
- 659 Refine via TDOA & AOA Triangulation — (xRef terrain elevation)
- 662 Apply 1st StdDv Filter — +/- 2m
- 665 Multilateration1 TDOA – GSM/CDMA
- 668 Multilateration2 TDOA – Wi-Fi — +/- 1m
- 671 Multilateration3 TDOA – Wi-Fi & Cell — +/- 0.5m
- 674 Bounded Weightings
- 677 Apply 2nd StdDv Filter
- 680 Merged Result pass/fail?
- 683 High-Res Geocodes — (xRef stored elevations) +/- 10cm
- 686 Sub-nanosec clock synchronization — +/- 1.5cm
- 689 xNet clock sync? — +/- 1cm
- 695 >40ms from last output? — +/- 1.5cm
- 698 End
- 692

METHOD AND SYSTEM FOR USER INTERFACE FOR INTERACTIVE DEVICES USING A MOBILE DEVICE

CROSS-REFERENCE TO RELATED APPLICATIONS

This application claims priority to U.S. provisional application Ser. No. 61/555,989 filed Nov. 4, 2011, entitled "Method and System for an Intuitive User Interface to the Television Screen Using a Smartphone or Tablet PC Device for Recognizing Gestures and Providing Visual Feedback On the TV Display," which is incorporated herein by reference in its entirety.

TECHNOLOGY FIELD

The embodiments of the present invention relate to the field of wireless pointer interfaces. More specifically the present invention relates to a system and method for establishing virtual pointer connections between a TV screen and a GPS-enabled handheld device for TV remote control or allowing a handheld device to act as a remote control for other interactive devices.

BACKGROUND OF THE INVENTION

The modern video viewing experience within consumer households has been changing dramatically in recent years, with more interactivity being introduced for content navigation, social media, T-Commerce, and more display output options becoming available in the home. In many households multiple TV displays are now complemented by laptops, PC monitors, and smaller displays like tablet computers and smartphones for video viewing throughout the home, and on the go. Smartphones are starting to be used to navigate video content, schedule and manage DVR recordings, and as remote control devices for connected TVs. While some systems may allow a smartphone or other network device to manage set top boxes via web-protocols, the interfaces are generally web-driven. Televisions and other traditional video displays currently lack the point-and-click user interface that personal computers have made available to their users for decades. Applicant is unaware of any commercially viable approach to turning generic TV monitors into interactive displays without connecting them to computers (e.g., displaying the output of a PC to a TV monitor), or embedding them with computer and sensor components (e.g., providing a console device with a camera or light bar and dedicated controllers for controlling the console, such as the Wii game console offered by Nintendo, which use dedicated controllers with cameras to sense the direction and orientation of lights provides by an IR light bar controlled by the console and placed at a fixed location relative to the TV screen.)

Several approaches have been proposed for making TV remote control devices behave more like a computer mouse, but none have proven to be convenient for the consumer or cost effective for CPE manufactures or PayTV service providers. For the video gaming community the industry has made great strides with the introduction and adoption of devices like Nintendo's Wii Wand and Microsoft's Kinect interactive camera system. These motion sensing methods for remote control of gaming systems are starting to bridge the gap between TV and PC human-machine interfaces, but they require the addition of expensive hardware into the TV/Gaming area in the home. Apple's success with the iPhone and iPad introduced the smartphone and tablet as new form factors for remote control devices. TV remote control mobile apps are available for smartphones and tablets that provide a traditional remote control interface on the touchscreen of the device, which may interact with the home entertainment components via an IR emitter on the phone or via a Bluetooth or network link to specialized set-top devices that provide a network control interface. These set-top devices may be provided by cable operators and may allow network devices to schedule or manage recordings, and in some cases allow real-time interaction with the cable box by receiving remote-control like commands over the network. These interfaces have been limited, however, to the traditional remote interface of up-down-right-left, numeric entry, and selection of pre-defined remote buttons. In some instances, selection of individual shows or recordings can be made using the touch screen of the smartphone or tablet, rather than by interacting with an interface on the TV.

Today's smartphones and tablets come with onboard sensors that can be useful for locating rough location and orientation of the device. However, these sensors generally lack the precision needed to utilize this information for providing a user interface. For example, GPS sensors are useful for providing a rough approximation of the location of the device, to allow the phone to be located within several meters. This may be sufficient to locate the phone near an address while navigating in a car or looking for nearby restaurants. However, these sensors have thus far been unable to replace the sensor used on other systems that provide home entertainment interfaces (such as cameras with IR range finders and IR beacons or ultrasonic devices that are hardwired into the TV or console devices.) Accordingly, there remains a disconnect between the capabilities of mobile devices, such as smartphones and tablets, and providing a truly interactive interface with TV displays or other interactive devices.

SUMMARY OF THE INVENTION

According to embodiments of the invention, mobile handheld devices, such as smartphones and tablet computers, can sense their position, location, direction, and motion in space, and can be programmed to recognize gestures. These devices can function as a virtual pointer and controllers with respect to their environment and devices such as television displays or home automation devices. These mobile devices can be programmed via their operating systems and apps to communicate with one or more servers that can communicate with devices, such as set top devices or home automation devices, that control the TV or any other devices that the user of the mobile device wishes to control or interact with. By providing methods to improve the precision used in calculating the location of the mobile device within its environment, an improved model of where the device is pointing in space can be created. By approximating the location and direction of the device, a system or method can determine where on a screen the user is pointing his mobile device or what interactive device a user is pointing a mobile device at. In some embodiments, a precise or approximate mathematical representation of the TV screen location (or location of any other object to be interactively controlled) can be calibrated and used to correlate an object or section of a display screen with the direction a user points a mobile device. In some embodiments, motions of the mobile device may be interpreted as gestures, allowing a mobile device to be used as a motion and gesture sensing remote control or virtual pointer.

Embodiments of the present invention address and overcome one or more of the above shortcomings and drawbacks by providing devices and systems for determining the position and orientation of handheld wireless/mobile device, such as a cell phone or tablet, and providing an app on the device to allow the mobile device to interact with a video display or interactive device, such as home-automation devices.

According to one embodiment of the invention, a system for interacting with a video display includes non-transitory computer-readable instructions for configuring a processor of a handheld wireless device to determining position and orientation information about the handheld device and sending the position and orientation information across at least one wireless network, and at least one server configured to receive the position and motion information and to determine the orientation of the handheld wireless device relative to a the video display. The position information can be derived from a distance measurement between the handheld wireless device and at least one wireless networking device, such as a Wi-Fi hotspot or a cell tower. The server can be configured to facilitate user interaction with a user interface on the video display in response to the position and orientation information.

According to one aspect of some embodiments, a set-top box, in communication with the at least one server, displays the user interface on the video display and updates the user interface in response to changes in the position and orientation information. According to another aspect of some embodiments, a server includes software operating on the set-top box. According to another aspect of some embodiments, non-transitory computer-readable instructions determine motion information relating to the position and orientation information to recognize gestures made by a user. According to yet another aspect of some embodiments, non-transitory computer-readable instructions allow a processor to recognize at least a subset of the following gestures: Select, Move Up, Move Down, Move Left, Move Right, Back, Forward, Scroll Up, Scroll Down, Scroll Left, Scroll Right, Hover, Stop, Play, Pause, Fast Forward, Rewind, Record, Save, Last, Channel Up, Cannel Down, Volume Up, Volume Down, Mute, Hide, Exit, Off, and Help.

According to one aspect of some embodiments, position information is derived from GPS signals received by the handheld device. According to another aspect of some embodiments, the user interface presents a pointer on the video screen that moves in response to movement of the handheld device. According to yet another aspect of some embodiments, non-transitory computer-readable instructions display, on a display of the handheld device, at least one menu that supplements or duplicates information displayed on the video display. According to still another aspect of some embodiments, at least one other wireless networking device comprises at least one Wi-Fi access point.

According to one aspect of some embodiments, distance measurement is determined by observing a form of radio frequency time of flight or communication time of at least one signal sent to and received from the at least one wireless networking device. According to yet another aspect of some embodiments, the server is further configured to facilitate interaction with a plurality of video displays, and to determine which of the video displays the user interacts with based on the position and orientation information. In some embodiments, the handheld wireless devices include one of a tablet computer and a cell-phone.

According to one embodiment of the invention, a system for facilitating interacting with an interactive device in a physical space includes a first set of non-transitory computer-readable instructions for configuring a handheld wireless device to determining position and orientation information about the handheld wireless device and transmitting the position and orientation information and at least one user input across a wireless network, a second set of non-transitory computer-readable instructions for configuring at least one processor to receive the position and motion information and to approximate the orientation of the handheld wireless device relative to a physical space, and a third set of non-transitory computer-readable instructions for configuring at least one processor to facilitate an interaction between a user and at least one interactive device in response to the position and orientation information and at least one user input. The position information can be derived from a distance measurement between the handheld wireless device and at least one wireless networking device, such as a cell tower or Wi-Fi device located within the physical space.

According to one aspect of some embodiments, the interactive device includes a video display. According to another aspect of some embodiments, the third set of non-transitory computer-readable instructions are configured to be executed by a home automation server and at least one interactive device comprises at least one of a light switch, an alarm device, and an HVAC device controlled by the home automation server. According to another aspect of some embodiments, the second set of non-transitory computer-readable instructions are configured to be executed by one or more servers in a cloud computing space configured to communicate with the handheld wireless device across the Internet. According to yet another aspect of some embodiments, the first set of non-transitory computer-readable instructions comprises instructions for displaying, on a display of the handheld wireless device, selectable actions that can be taken to interact with the at least one interactive device to solicit the at least one user input.

According to one aspect of some embodiments, selectable actions displayed on the handheld wireless device change depending on which of a plurality of types of interactive devices that the points. According to another aspect of some embodiments, the first set of non-transitory computer-readable instructions comprise instructions to recognize gestures made by the user to determine at least one user input. According to yet another aspect of some embodiments, the wireless networking devices include at least one Wi-Fi access point. According to still another aspect of some embodiments, the distance measurement is determined by observing a form of radio frequency time of flight or communication time of least one signal sent to and received from the at least one Wi-Fi access point. According to one aspect of some embodiments, position information is further derived from GPS signals received by the handheld device.

According to one embodiment of the invention, a method for facilitating interaction between a mobile device and an interactive device includes steps of observing, utilizing an antenna and one or more sensors on a handheld wireless device, one or more distances relative to a plurality of network devices in a space and an orientation of the handheld wireless device and receiving, across at least one network, location information from the handheld wireless device that reflects the position and orientation of the handheld wireless device within a physical space. The method may also include calculating a position and orientation of the handheld wireless device relative to at least one interactive device from the location information to determine that a user is pointing the handheld wireless device relative to the interactive device, determining at least one command input from a user of the handheld wireless device, and carrying out the command on the at least one interactive device in response to the step of determining and the position and orientation information.

According to one aspect of some embodiments, the interactive device includes a video display. According to one aspect of some embodiments, the interactive device includes at least one of a light switch, an alarm device, and an HVAC device controlled by a home automation server. According to another aspect of some embodiments, the step of observing includes observing a GPS position of the handheld wireless device. According to another aspect of some embodiments, the position of at least one interactive device can be calibrated by providing computer-readable instructions to allow the handheld wireless device to record a position of at least one portion of the at least one interactive device when the handheld wireless device is placed approximately at the position of the interactive device in the physical space.

According to one aspect of some embodiments, motion gesture made by a user of the handheld wireless device are detected to determine at least one command input. According to another aspect of some embodiments, the handheld wireless device detects a touch screen input made by a user of the handheld wireless device determine at least one command input. According to still another aspect of some embodiments, a cursor can be displayed on a video display that indicates approximately where a user is pointing the handheld wireless device.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIG. 15 is a logic flow diagram of a positioning algorithm for use with some embodiments of the present invention.

DETAILED DESCRIPTION

Figure 1:
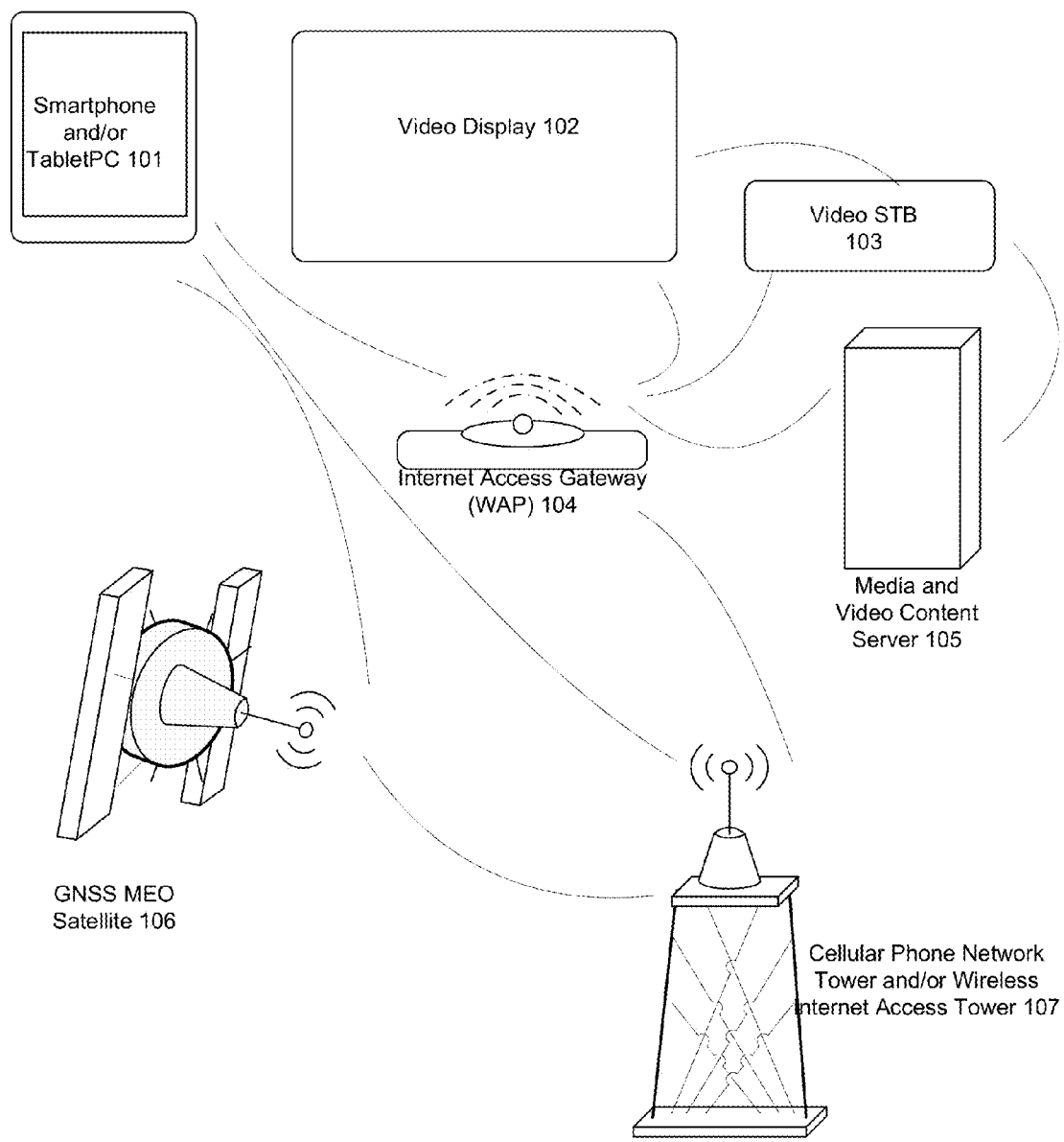
FIG. 1 is a component diagram of the system hardware and devices used in some embodiments of the present invention.

Some Embodiments of the present invention address several of the shortcomings of the prior art by providing software methods and systems that allow a smart phone or a tablet device (i.e., a mobile device, which may also be characterized as a handheld wireless device) to act as a virtual pointer and remote control for interacting with a video display or interactive objects in a physical environment, such as inside or outside a house or apartment. In some embodiments, software on the mobile device utilizes existing sensors on the device to provide a relatively precise approximation of the location and orientation of the mobile device within a physical environment. By approximating the location and direction of a mobile device, an approximate model of where the device is pointing in the environment can be created. Using the model of the direction in which the mobile device points, software can further determine what the device points at. For example, by calibrating the location and orientation of a TV display, when a mobile device points to a certain location on the TV display, the location and orientation of the mobile device can be used to determine the portion of the TV display to which the user is pointing.

Furthermore, in some embodiments, relative motion sensors (such as accelerometers) provided on typical mobile devices can be used to track, in real time, how a user moves the mobile device relative to the TV display. This can be used to allow the mobile device to act as a virtual pointer or to recognize motion gestures. When a user points to a certain section of the TV screen, the relative motion of the device can be tracked, allowing a visual indicator of a cursor approximating where the user is pointing to be displayed on the screen that tracks the motion of the mobile device as the user points to other portions of the screen. In this way, in some embodiments, the mobile device can act like a virtual handheld mouse capable of interacting with a set top box that controls the output of a TV. Similarly, a quick swipe of the mobile device when pointing at the TV can be identified using internal motion sensors and interpreted as a gesture command to skip forward when viewing a recording on the TV or to change to the next item in an onscreen menu.

Additionally, in some embodiments, a screen on the mobile device can be used to provide additional information to a user or to act as an additional input. For example, the screen on the mobile device can display a copy of the menu on the TV screen to allow a user to select items using the touch screen on the mobile device as an alternative input for selecting a menu item on the TV screen by moving a pointer to that item. In some embodiments, the mobile device screen can display buttons that can be used when interacting with the screen, such as "OK" or playback buttons. In some embodiments, detailed information about a show or recording, such as filmography, actors, ratings, reviews, etc. can be displayed on the mobile device while the TV displays a schedule or plays back a recording. In some embodiments, the information displayed can be updated as the user moves through menus or as he points the mobile device at different portions of the screen. For example, as the user points at different items in a schedule, the screen on the mobile device can update to display information about each show or recording to which the device momentarily points.

In some embodiments, a mobile device can interact with an interactive device other than a TV display. For example, a home automation server can be used to make lights interactive. When a user points a mobile device at a lamp, the location and orientation of the mobile device can be extrapolated to determine that mobile device is pointing at a known location of a lamp. A display on the mobile device can be updated to display on/off buttons to allow the user to turn on or off the lights. Similarly, the mobile device can be used to arm or disarm an alarm system. A keypad can be displayed, or a simple on/off button can be displayed when a user points at an IP-enabled alarm panel.

Positioning

In one embodiment the Smartphone's location is synchronized with the Television Display location using a global navigation satellite system (GNSS) and differential Global Positioning System (DGPS) coordinates for precision GPS Geocode readings. Civilian applications of GNSSs (e.g., US GPS) use CDMA coding in primarily the High frequency, VHF and UHF bands where the signals travel by line of sight, and in the US system NAVSTAR satellites transmit signals on one of two L-band frequencies (designated as L1 [civilian and military use] and L2 [military use]). The L1 signal is modulated with a coarse-acquisition code (C/A-code), and a precision code (P-code), and the L2 signal is modulated with a P-code only. To date P-code GPS applications have been limited to military use and can log geocode (Lat/Long coordinates) to within centimeters of accuracy precision for Satellites, ground based stationary or mobile receivers, and airborne receivers. Civilian GPS is only accurate to within meters for real-time readings, unless augmented with a Differential-GPS (DGPS) technique. According to Garmin, their newer GPS receivers improve accuracy to less than three meters on average from an earlier fifteen meter accuracy benchmark. DGPS can use one or more terrestrial base-stations with known locations to triangulate with three or more MEO satellites. The U.S. Coast Guard's DGPS correction service uses a network of towers to transmit a corrected signal, making it the most commonly used DGPS service, but it is geared toward maritime applications without the need for centimeter-level precision.

Today's smartphones have a differential beacon receiver and beacon antenna already on-board in addition to their GPS receiver. Mobile devices can derive an approximate location using an onboard GPS receiver to determine a position within a few feet using satellite signals. Furthermore, since smartphones and other mobile devices communicate with cellular towers and with other base-station type devices such as Wi-Fi wireless access points (WAPs) with known terrestrial stationary locations, mobile devices can have access to reference points that can be used for augmenting high-resolution precision DGPS geocodes with further accuracy. In some embodiments, this accuracy can be within centimeters. In some embodiments, improved accuracy, including sub-centimeter accuracies, may be achieved by utilizing longer observation times. These observation times may utilize higher post-processing requirements and may extend for hours. In some embodiments, post processing of location information from GPS and DGPS signals can be performed outside the mobile device by sending the information gathered to an external server, such as a cloud-based server accessible via the Internet.

In North America alone there are over 200,000 cellular tower locations, and public WAP locations are growing to an order of magnitude more sites. In addition, the average home has several active Wi-Fi devices with a generally fixed position. For example, a wireless router in a home typically does not move often once installed. Set-top boxes and video game consoles may use Wi-Fi, and sit in the same location near a TV once installed. In contrast, leading subscription DGPS services use roughly 200 tower locations globally, and as consumer applications of DGPS for precision geocodes become common, cellular tower sites, and WAP locations can be used for DGPS globally. Cellular tower operators, industry analysts, and service providers maintain databases of highly accurate geocodes of cell tower locations for wireless network maintenance and engineering. Nielsen Mobile, for example, publishes a Cell Tower Locator Coverage Measurement report and database as a subscription service. Those skilled in the art can access cell tower geocodes and, in some embodiments, use those geocodes for DGPS correction. In some embodiments, this data can be provided by telecom carriers for the convenience of customers, possibly as a value added service. One skilled in the art may also get the geocodes used for calculating location with the specific decimal-degree or degree-decimal-minute format including pre-defined number of decimal integers such that near centimeter precision resolutions can be achieved. This level of high resolution precision geocoding using civilian GNSS methods for real-time position measurement can enable mobile devices with virtual pointer functionality without the addition of new hardware in the TV viewing area, i.e., the consumer's living room.

In some embodiments, a technique, which may be referred to as secondary or supplemental DGPS (SDGPS) can be used to refine the geocode coordinates of a mobile device and any interactive devices or TV displays. In some embodiments a substantially real-time sequential multilateration (RTSM) technique, such as that shown in FIG. 15 can be used to provide SDGPS coordinates. In high-rise locations or in rural or mountainous locations the DNSS signal could be obscured, or DGPS beacon coverage might not be dense enough to provide accurate DGPS readings. As noted in the previous embodiment the GNSS's RF signals travel by line of sight and are subject to reflections or blockage and terrestrial GNSS receivers require signals from four or more satellites in the MEO constellation at one time to resolve a GPS 3D position. Four pseudo-range observations and a clock bias parameter are included in GNSS signals to compute the X, Y, and Z (latitude, longitude and altitude) coordinates of a point.

Indoor applications that require high levels of precision and accuracy for location sensing can benefit from a convenient way to obtain secondary or supplemental base-station distance readings, particularly since time-of-day, poor weather conditions, and other factors can interfere with the number of satellites and/or towers available for communication with the Smartphone's receivers at any given time. The US GPS system has been operational since 1995 and other countries are still trialing CDMA GNSSs, so satellite coverage remains a hurdle with just 24+ MEO satellites at ~12 mi altitude travelling at ~7,000 mph. The U.S. government is pursuing a modernization effort known as GPS III, with one aim to improve the accuracy and availability for all users, and newer satellites are planned for launch in 2013+. Targets for signal strength improvements of GPS III are 100 fold, and geocode location accuracy could see similar gains that are only expected to improve overtime with newer GNSS capabilities likely coming online from international systems like the EU's Galileo constellation. Even with these improvements, the need for a localized DGPS supplemental reference location is anticipated well into the future for some consumer settings. The SDGPS method uses local wireless devices to create base-station locations that can augment the DNSS satellite signals and the terrestrial-based DGPS readings.

System

FIG. 1 depicts an exemplary system for use with embodiments of the invention. A mobile device 101 (smartphone or tablet) makes an internet protocol connection with a wireless access point 104 Internet Access Gateway via Wi-Fi (e.g., 802.11). Mobile device 101 can include a processor, a screen and keyboard or touchscreen interface, a GPS receiver for sensing GPS coordinates from GNSS signals, a plurality of sensors for determining acceleration and orientation, including magnetic sensors and accelerometers, a Wi-Fi transceiver and antenna, and a cellular transceiver and antenna suitable to communicate with a CDMA, GPRS, GSM, LTE, or other carrier network. Wireless device 101 can establish a cellular connection with a carrier's wireless tower 107 via 3G or 4G wireless communications or the like. Wireless device 101 can receive GPS signals from GNSS Satellites 106 via traditional signaling protocols. Tower 107 can also receive GPS signals from GNSS Satellites 106 via traditional signaling protocols to determine geocode or have a predetermined location recorded. Since the tower 107 is in a fixed location, extended stationary measurements that determine precise geo location (Lat/Long/Alt) may be possible. Alternatively, tower 107 may not need an active GPS receiver; a precision DGPS survey can be done to create a database of known tower locations. In some embodiments, wireless access point 104 can also make a Wi-Fi connection to a Wi-Fi antenna on tower 107. In some embodiments, mobile device 101 can communicate with servers on the Internet via broadband connections of either wireless access point 104 or tower 107 for accessing cloud-based services and for offloading computationally intensive processes. In some embodiments, wireless device 101 can communicate with other IP devices on a home network that shares access to wireless access point 104.

Wireless device 101 determines DGPS precision geocode coordinates via communications between the GNSS satellites 106, one or more tower locations 107, wireless access point 104 and/or other nearby Wi-Fi devices, such as Wi-Fi enabled set-top boxes. A user can calibrate the location of a video display 102 using the method described in FIG. 4. Video display 102 receives a physical connection (i.e., HDMI) from a video set top box (STB) 103. Video STB 103 makes a Wi-Fi connection with wireless access point 104, and optionally communicates directly over Wi-Fi or Bluetooth with mobile device 101. A media and video content server 105 makes a wired or wireless Ethernet connection to the Video STB 103 and the wireless access point 104. This could be a long distance Internet connection of a LAN or connected storage connection. Media and video content server 105 can supply television signals and/or recorded programming and information that may be accessed by a user interacting with video display 102.

The system in FIG. 1 uses position and orientation information gathered from sensors (including antenna and receivers) on the mobile device to determine where the mobile device points and communicates this to video display 102. This may be accomplished in a number of ways in different embodiments as described throughout. In some embodiments, the processor on the mobile device can be programmed to calculate its position and orientation with sufficient precision and communicate this position and orientation information to a server across a network. The server may be a remote server on the Internet, including a cloud-based server, or may be software operating on local hardware, such as a set top box in the user's home network. This information can be communicated across a Wi-Fi network or a cellular network, including any additional transport networks, such as the Internet. In some embodiments, the mobile device does not calculate its entire position and orientation. The wireless device may gather position information, such as GPS coordinates, distance measurements relative to known locations, such as time of flight information or signal strength information relative to cellular towers or Wi-Fi access points, or other wireless devices, such as a set top box, and communicate this position information to the server for additional calculation. This may allow the server to use more robust processing components to calculate a more precise location. The server may also have access to additional information, such as precise geocodes for the devices with which the mobile device communicates. This may offload processing from the mobile device, allowing a smaller or less processor intensive client component to operate on the mobile device.

It should further be appreciated that in some embodiments, the server and set top box may be separate, while in other embodiments the server may be software operating on the set-top box. In some embodiments, the mobile device, the server, and the set-top box all participate in determining the mobile device's position. Preprocessing tasks involved in calculating this position may be broken down between the mobile device, the server, the set-top box in any reasonable manner evident to persons of ordinary skill.

Similarly, in some embodiments, the mobile device determines its orientation using onboard sensors, such as accelerometers, magnetic sensors, or by extrapolating its orientation by observing changes in position, and communicates this orientation information to the server and/or set top box. In some embodiments, the server and or set-top box 103 may participate in calculating an orientation of the mobile device from this orientation information.

Once the position and orientation of the mobile device has been determined, one of the mobile device, the server, or the set-top box 103 (or any combination thereof) may then apply this position and orientation to an environmental model that describes the position and orientation of the TV display 102 to determine where on the screen the mobile device is pointing. Video set-top box (STB) 103 can then display a cursor or other visual feedback to the user about the extrapolated position on the screen that the mobile device points to. In some embodiments, no visual feedback is displayed, but a user may interact with the screen and select icons or menu items by clicking or gesturing while pointing at a portion of the screen. Video STB 103 may communicate with video display 102 to display any menus, cursors, or information selected by the user.

Video STB 103 can record pointer/cursor click locations on video display 102, and transmit the selection of information to media content server 105 for playback of selected video content. When an optional Internet connection is available between video display 102, and the wireless access point 104, selection of OTT video assets that bypass video STB 103 can also be played out on video display 102.

Figure 2:
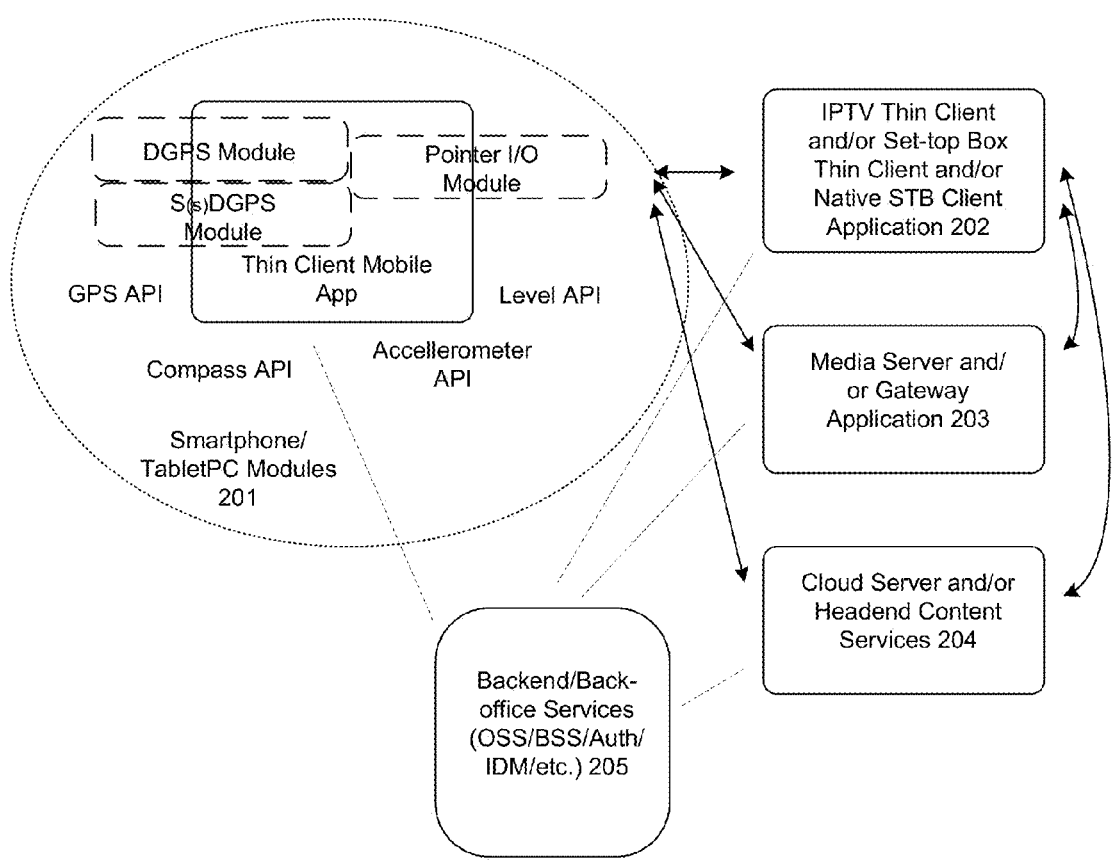
FIG. 2 is a block diagram of the system software component modules used in some embodiments of the present invention.

FIG. 2 depicts an exemplary software architecture for use with some embodiments of the present invention. The mobile device 101 contains hardware/software modules 201 for determining position and orientation information. Exemplary hardware includes a magnetic compass, an accelerometer, a level, cellular and Wi-Fi transceivers, and a GPS receiver. Exemplary software includes APIs for accessing these hardware modules. In addition, one or more apps or the operating system can include software modules for accessing and calculating position from GPS, DGPS, SDGPS, and receiving user input from a user-interface (e.g., a pointer API). These modules can interface to a thin client mobile app via standard APIs to convey this information to one or more servers or set top boxes. Mobile device 101 can communicate via two-way communication with client modules on video STB 103 or video monitor 102. These clients can include IPTV thin client 202 operating on video display 102, and/or a STB thin client operating on video STB 103, and/or native STB client application. In some embodiments, software operating on video STB 103 can also be described as a server. In some embodiments, IPTV client 202 or an STB client 203 acts as clients for backend services 205, which may be provided remotely via Internet communication with a cable provider.

In some embodiments, mobile device 101 may also have two-way communication with an optional media server and/or gateway application 203, by proxy of STB software 202. In some embodiments, mobile device 101 may also have two-way communication with a cloud server and/or headend content services 204, which host video content for delivery to a display device via STB, media server/gateway, or embedded SmartTV applications, by proxy of STB software 202. Backend Services 205 can control the rights and privileges of the other components' interactions with each other. These services include management, billing, authentication, identity management, entitlements, personal settings; e.g., parental controls, and digital rights management (DRM).

Calibration and Initialization

Figure 3:
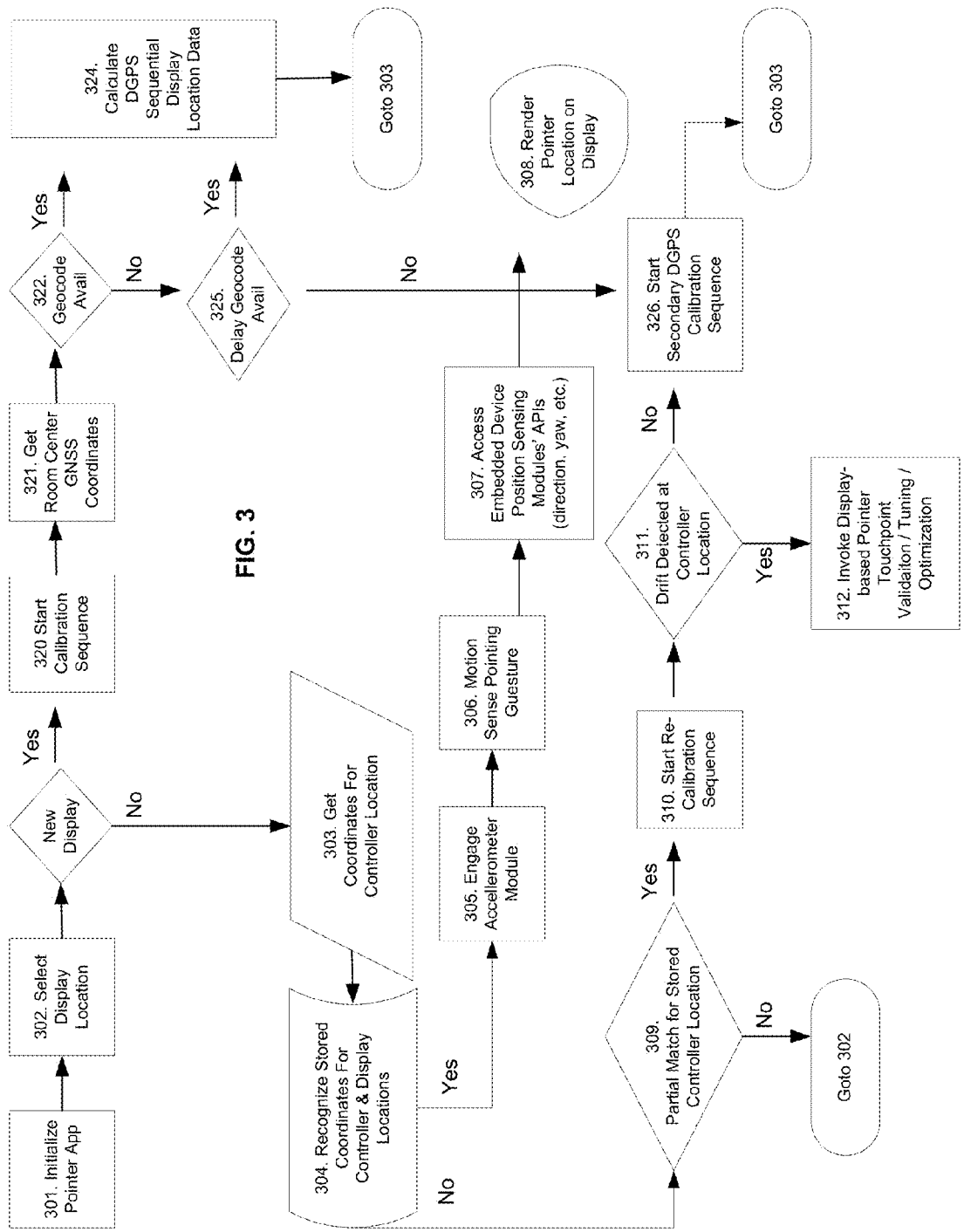
FIG. 3 is a logic flow diagram of the display setup and calibration used in some embodiments of the present invention.

FIG. 3 illustrates the operation of software instructions used to implement embodiments of the present invention. The steps shown in FIG. 3 may be carried out by an app on mobile device 101, server software a remote server or a set-top box, or any combination thereof. At step 301, client software 201 (described as a pointer app) initializes. This can include gathering any computational, communication, and sensor resources on the mobile device necessary for operating the client. At step 302, the user selects a pre-calibrated display or chooses to identify a new display. If no new display is selected, the pointer app retrieves precision geocode coordinates for the mobile device via methods described herein using onboard sensors at step 303. At step 304, the client determines whether it recognizes stored coordinates for a nearby display.

If the pointer app determines that a display is nearby, the pointer app can begin facilitating the interaction of mobile device in the display. At step 305, the pointer app engages the accelerometer on the mobile device to begin sensing the motion of the device. At step 306, the motion of the device is monitored to sense gestures performed by the user. Examples of gestures may include, for example, swiping in either direction, a quick flick/jab to indicate a selection, rotating the device to operate a jog dial, tilting the device in any direction, which may indicate that the user would like to move the cursor on the display. Gesture interpretation can also make use of embedded position sensing modules via provided APIs, at step 307. The pointer app may access these APIs to determine direction, yaw, tilt, etc. At step 307, the direction information provided by the sensors can be used to determine not only gestures, but also the location on the display that the mobile device points to.

At step 308, the pointer app may render a pointer location on the display. This may include highlighting an icon that is selected or by providing a movable cursor on the screen.

If no display is recognized near the device at step 304, at step 309, the software determines whether a partial match can be found for a nearby display. If no match can be found, the method returns to step 302. If at least a partial match can be found, at step 310, a recalibration sequence can begin. An example of this process is shown with respect to FIG. 4. Recalibration process 310 may be like calibration process 400, shown in FIG. 4. To calibrate the screen, the mobile device is moved to predetermined locations on the display in these locations, allowing the pointer app to record the positions in physical space using the GPS and supplemental GPS positioning described herein. At step 311, the recalibrated positions of the display can be used to address any drift in the DGPS positioning of the mobile device. For example, if a TV display has not moved and the recalibration step 310 indicates that the model represents the display as having moved by some distance, that distance can be used to offset the determined position of the mobile device. This can allow the mobile device's absolute position to be estimated using less accurate GPS signals, while the relative motion of the device can be used to approximate the devices current location with increased accuracy.

If DGPS/SDGPS precision geocode values determined sensed by the mobile device are corrupted or drift has been detected such as due to signal noise, a pointer tuning and optimization sequence 312 can be used. In some embodiments, optimization sequence 312 can utilize manual inputs from the user, such as by allowing the user to tell the system that the mobile device is packed a known location, such as a corner of a coffee table. Accelerometers and orientation sensors in the mobile device can then be used to determine the location and orientation offset from that known position as user begins to use the mobile device.

To add a new display, at step 320, the pointer app begins a new calibration sequence. The sequence can be used to add a new display or new environment. At step 321, GPS-based coordinates are gathered from the mobile device when the device is placed at a known location in the room with the display. For example, the device may be placed on a table near where the mobile device will be commonly used as a pointer device for interacting with the display. In some embodiments, GPS coordinates can be gathered for a pre-determined period of time, such as an hour during a calibration phase, allowing coordinates to be accumulated and averaged. This may increase the accuracy in calibrating the location of that position in the room. In some embodiments, the position used at step 321 may be used as an initialization position for using the mobile device as a remote pointer in the future. For example, a device may be placed at a known location at the beginning of each use of the device as a virtual pointer. In some embodiments, a user may be provided with a sticker having a QR code or other optical marks or RFID tag, allowing the user to easily initialize the mobile device as a virtual pointer at a known location during each session she uses the mobile device as a virtual pointer. The device may be placed at or near this location during future uses, allowing position sensors and accelerometers to be used to determine or improve the calculation of relative offset positions from this initialization position as the user uses the mobile device as a virtual pointer.

During initialization phase, at step 322, the mobile device determines whether or not a geocode with a desired precision is available for the mobile device. This geocode may be provided by GPS receivers in the mobile device. In some embodiments, a mobile device may be placed at the initialization position for one or more hours to accumulate an average geocode from GPS signals to be used as the baseline position. In some embodiments, additional signals can be used to provide a secondary differential GPS position. For example, Wi-Fi signals or other signals from networking devices at fixed locations, such as Wi-Fi hotspots and cellular towers can be used to provide additional positioning information to supplement GPS signals. In some embodiments, time of flight between the mobile device and the other networking devices is used to approximate the relative distance between mobile device and those other networking devices. In some embodiments, signal strength of the other devices may be used to assist in determining the distance between mobile device and those fixed location networking devices.

Figure 4:
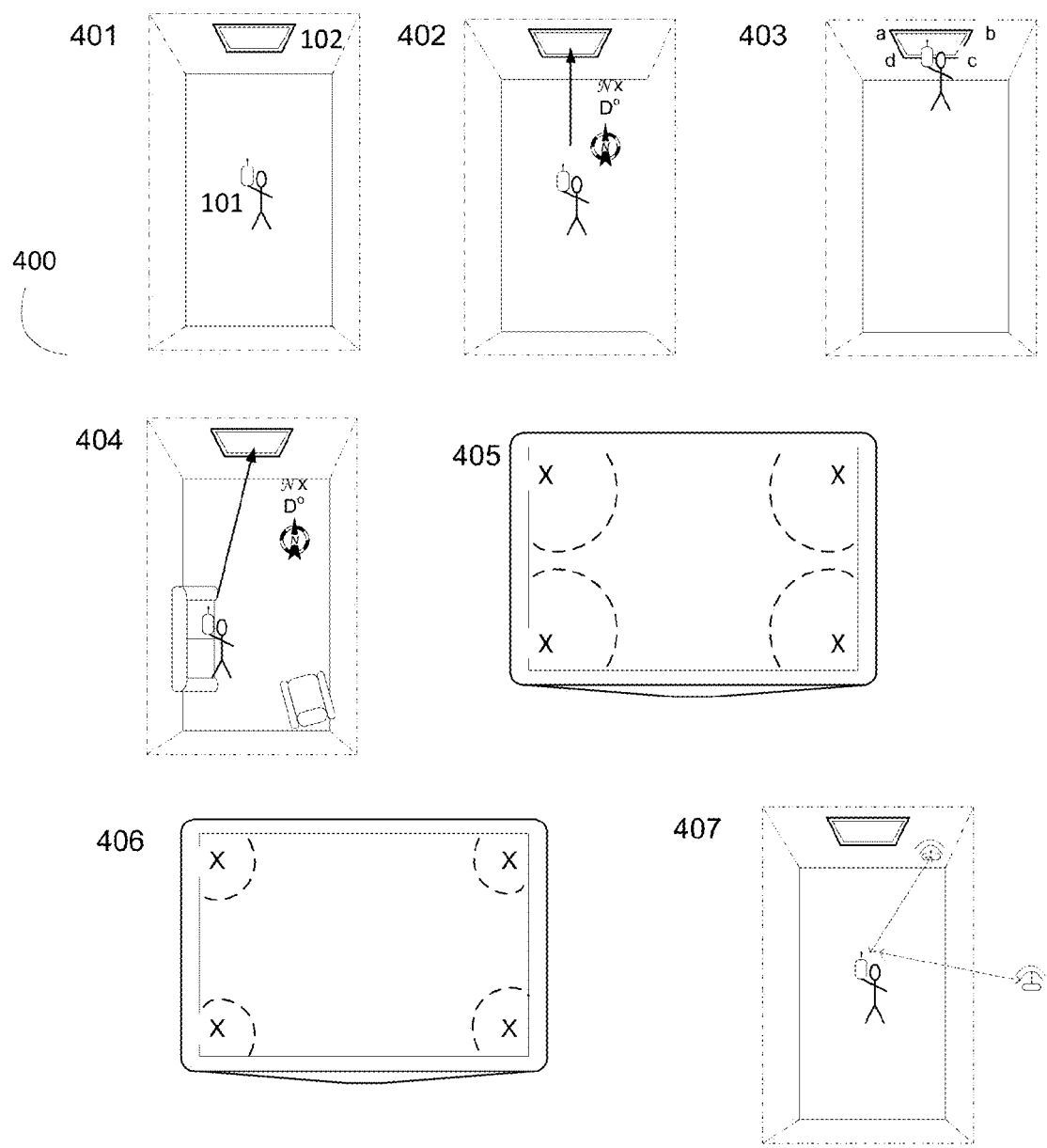
FIG. 4 is a calibration sequence diagram used in some embodiments of the present invention.

If a precise geocode is available, at step 324, the user goes through a calibration sequence described in FIG. 4 to identify certain locations on the display and records these. The pointer app then calculates the GPS locations for these locations on the screen. These DGPS positions can be determined using any of the methods described herein, including recording GPS positions, as well as using supplemental position information, including recorded offsets from the fixed location in step 321 using the accelerometers, or by utilizing calculated distances from other networking devices, such as Wi-Fi access points and cellular towers.

At step 325, if no precise geocodes are available, the pointer app determines whether GPS signals are sufficient to allow increased accuracy by recording a geocode over a longer period of time, such as one or more hours. If the option is available, the user can be instructed to place the device at a fixed location in the room and leave it for a predetermined amount of time until a sufficient GPS lock can be obtained. During this initialization, GPS signals, as well as signals from other networking devices, can be used to refine the geocode location of the mobile device. Once a sufficient geocode location can be recorded for the location of the mobile device, the user can proceed to calibration step 324, where the user will record certain locations on display, such as each corner of the display. This allows the pointer app to determine a relative location of portions of the screen relative to a known location of the room to allow the system to utilize an environmental model of the display relative to the room when the user attempts to interact with the display a later time. Once step 324 is complete, the method can return to step 303.

If no delayed geocode is available at step 325 (or if drift has been detected at step 311), the pointer app proceeds to step 326, whereby the app starts a secondary DGPS calibration sequence. This sequence is described with respect to FIGS. 4 and 6. The method then returns to step 303.

FIG. 4 illustrates the sequence of steps 400 that a user can be walked through to perform calibration of locations in the physical space in which the mobile device and pointer app will be used. At step 401, a user stands at a predetermined location in a room, such as the center of the room. The predetermined location used may be at the preference of a user. For example, in some embodiments, a user may select a corner of a table in a room or any position that may be close to where the user will operate the remote app. During step 401, on device 101 uses a remote app to determine an estimate of a geocode for the predetermined location. In some embodiments, this position will be determined with a minimum precision necessary to give a user a satisfactory user experience when using remote app in the future.

In some embodiments, an accurate geocoding of the predetermined location may not be necessary. For example, in embodiments where a mobile device will initialize at that predetermined location each time the remote app is used (for example, requiring the user to check-in his mobile device at a predetermined location on a coffee table when he initializes the remote app to interact with a display each time), the geocode for that location can be approximate. In these embodiments, once the mobile devices check in with that predetermined location during future uses, only the relative position of that device to that predetermined location need be used to provide fairly precise calculation of the position of the mobile device in the room to interact with video display 102 in a satisfactory manner. The geocode of the predetermined location is recorded by the remote app as a result of step 401.

At step 402, the user holds mobile device 101 at the predetermined location and orients the device and a level position pointing toward the center of the display 102. This orientation information can be recorded by the remote app to provide a baseline orientation for mobile device 101. This baseline orientation may be obtained from various orientation sensors in mobile device 101, described throughout. In some embodiments, the steps for a 402a can be repeated not only during a calibration phase 400, but during a viewing phase, each time the user enables the remote app. It should be appreciated, that in some embodiments, repeating steps 401 and 402 may not be necessary where accurate position orientation information can be obtained using the sensors aboard mobile device 101.

At step 403, during a calibration phase, the user walks to video display 102 and holds mobile device 101 at predetermined locations on the display, such as each corner of the display. This allows the remote app to record the position and orientation of the video display. It can also be used to determine information such as the size of video display 102, allowing the remote app to determine when a user is pointing mobile device 101 at the display 102 and to determine what portion of display 102 the user is pointing at. For example, a user may be instructed to hold at the upper left corner of the display. User may click a prompt on mobile device 101 when he has positioned the device at the requested location. The user may then be walked through a sequence of steps to place the mobile device at different corners of the display, allowing the remote app to record these positions as geocodes or positions relative to the predetermined location recorded in step 401.

In some embodiments, the user may be instructed to record various locations throughout the room where the user is likely to use remote app. For example, in step 404, a user is instructed to sit at a preferred viewing location and hold the mobile device as he normally would while using the remote app. When the user sits as instructed and holds mobile device 101 in a comfortable position that she will use during normal viewing, the remote app may record this position as a geocode or position relative to the predetermined location from step 401. The remote app may also record the orientation of mobile device 101 when the user points the device to the center of video display 102 at this new location. Step 404 may be repeated for various preferred viewing positions.

In addition to pointing to the center of video display 102 to calibrate various viewing positions, at step 405 the user may also be instructed to point mobile device 101 at various positions on the video display to further refine the expected orientation for a mobile device at the seating location when interacting with the video display. For example, after a user has calibrated the mobile devices position at a seating location at step 404, the user may be instructed to point the device from that location to various positions on the video display, such as each corner of the video display. In some embodiments, the user may be asked to refine the orientation of the device from each seating position. At optional step 406, once a user has pointed a mobile device generally to the corners of via display, the user may be instructed to point the mobile device at smaller objects on the screen, such as icons or targets. Step 406 may be useful for further refining the precision in the orientation of mobile device 101 when interacting with displays where further granularity may be desired.

At step 407, the user may then begin to use the mobile device 101 is a virtual pointer. Mobile device 101 receives signals from GPS, DGPS, and SDGPS sources, such as Wi-Fi hotspots and cell towers.

Operation

Figure 5:
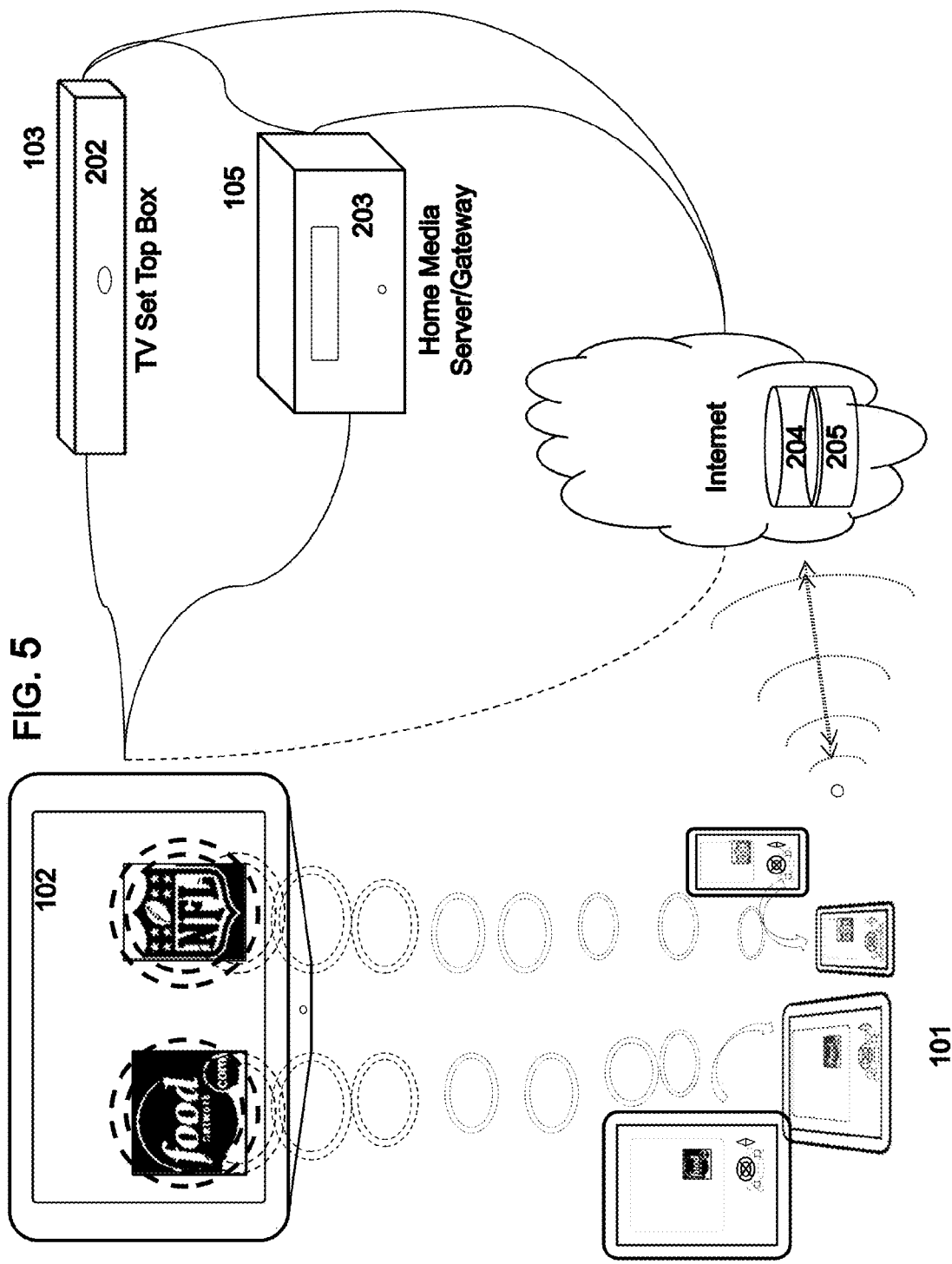
FIG. 5 is a high-level user interface and system components diagram for use with some embodiments in the present invention.

FIG. 5 illustrates the system components and user interfaces that may be used to establish virtual pointer connections between a mobile device 101 and video screen 102. Video screen 102 may include physical connections, such as HDMI connections, to set-top box 13 and media server and gateway 105. As discussed with respect to FIG. 2, these components may include software portions 202 and 203. Setup box application 202 delivers requested content to video display 102 from either a Media Server 105 or a remote cloud-based content hosting service 204 once authorized by a remote cloud-based BSS/OSS 205. A virtual pointer connection (e.g., providing motion sensing, virtual pointer, gesture recognition, and wireless mouse functionality) is established via physical proximity between mobile device 101 and video display 102. The interpretation of this virtual physical connection can enable a user to interact with video display 102, as if the mobile device was directly linked to the TV like an interactive laser pointer. In addition, the user may interact with video display 102 using gestures and the screen of mobile device 101. An overall user interface may allow motion sensing, point and click interaction, and gesture sensing using the motion sensors or the touchpad of mobile device 101.

In some embodiments, the display 102 and the display on handheld device 101 display duplicate interfaces. For example, both displays may display a copy of the TV Guide, allowing a user to select programs from the schedule and navigate between channels. In some embodiments the display 102 and mobile device 101 simultaneously display replicated content navigation icons. In some embodiments mobile device 101 may allow a user to interact with the touchscreen to provide a traditional remote interface, including common thumb-based remote buttons that may be selected. Exemplary commands that may be available via the touchscreen include, but are not limited to, click okay, up, down, left, right, last navigation, save/record, remind, add to favorites, share, comment, and delete/block. In some embodiments, the user may decide whether to interact with video display 102 via the virtual pointer interface or via the touchscreen interface of mobile device 101.

Virtual pointer connection between mobile device 101 and screen 12 may also allow touchscreen-based scrolling, allowing a user to flick between menus using the touchscreen while pointing the device at the TV screen. For example, a user may scroll through a library of graphic icons using the touch screen of mobile device 101, while the system simultaneously displays information or selected content on video display 102. In some embodiments, the content may be synchronized, such that as the user scrolls through items on the touchscreen, information on the display 102 updates in real-time in response to the user's interaction with the touchscreen. In some embodiments, this may include replicating content navigation items presented on both the TV monitor display and the mobile device touchscreen to enhance user interaction using a virtual pointer connection.

In some embodiments, dual screen functionality may be utilized, allowing the user to simultaneously interact with a menu on video display 102, while also interacting with user-interface on the display of the mobile device, which may be different from the menu and information displayed on the video display 102. In some embodiments, for example, the touch screen on mobile device 101 may display traditional arrow-based navigation icons corresponding to traditional buttons on a remote, while the user may simultaneously interact with the video screen by motioning the mobile device up, down, left, or right to achieve similar navigational results. This may present a more intuitive user experience, allowing the user to choose how to interact with video content while using his mobile device. In this manner, in some embodiments, the virtual pointer capabilities allow the mobile device to act simultaneously has a remote or a virtual mouse.

Figure 6:
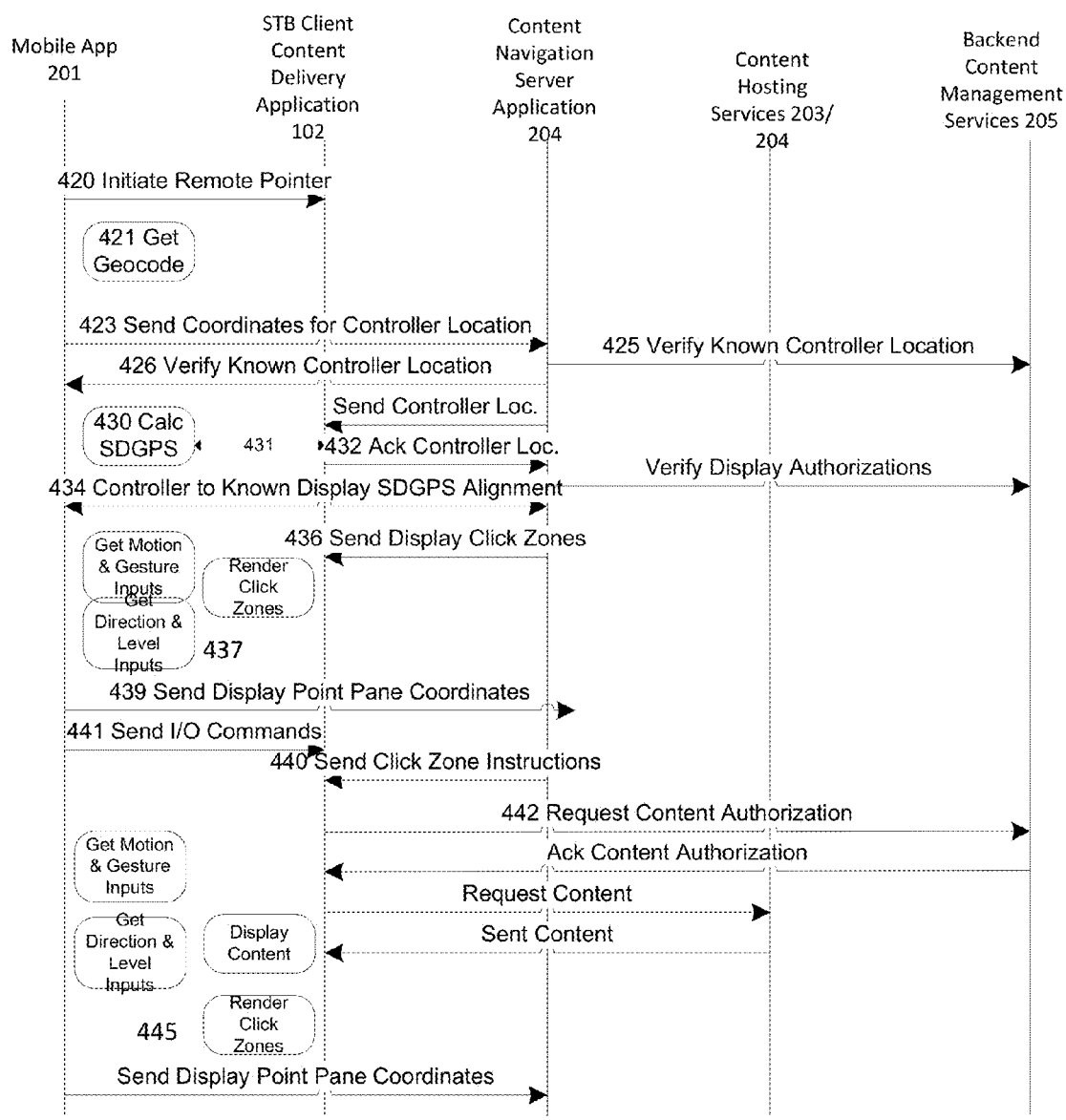
FIG. 6 is a messaging communication sequence diagram illustrating elements of some embodiments of the present invention.

FIG. 6 shows an exemplary communication diagram illustrating the communications between a mobile app 201 on mobile device 101, a set-top box client 202, and a content navigation server 204. Content navigation server 204 works with mobile app 201 to determine how the user intends to interact with the display that he points at. Setup box client 202 and content navigation server 204 can also communicate with other services, such as content hosting services 203 and backend content management services 205. It should be appreciated that, in some embodiments, content navigation server 204 and set-top box client 202 may be software operating on a common set-top box. In some embodiments, content navigation server 204 may be a cloud-based server that may be balanced across multiple server computers that communicate with mobile app 201 and set-top box client 202 via the Internet.

At step 420 mobile app 201 initiates the remote pointer application and communicates to STB client 202 that the remote pointer app has been initiated. At step 421, mobile app 201 determines a location for the mobile device, such as gathering a geocode from GPS, DGPS, and/or SDGPS signals. At step 423, mobile app 201 sensors communicate with server 204 to inform the server of the mobile devices location and orientation. Information transmitted in step 423 may include any reasonable form of position and orientation information about the mobile device, such as geocode information, yaw, pitch and direction information, distance measurements from known locations, etc. At step 425, server 204 may communicate with backend content management services 205 to inform it of known locations of devices described by the location and orientation information received from mobile device and to verify the display authorizations for the user of the mobile device. In some embodiments, content navigation server 204 will also verify the controller locations at step 426 by communicating an acknowledgment to mobile app 201.

At step 430, mobile app 201 refines its position using SDGPS signals. Mobile app 201 may communicate with a terrestrial DGPS tower or further augment SDGPS geocode resolution through communications with other local wireless (such as a WAP or cell tower) to refine its precision geocode location. When real-time or near-real-time DGPS precision geocode calculations are processor intensive beyond the capabilities of the mobile device, they can be off loaded to the content navigation server 204 by sending unrefined position and orientation information from mobile device to server, allowing server to calculate position and orientation of the mobile device (step 431). The server may then send (step 432) controller location data about the mobile device to STB client 202. This may include sending a list of object locations from content navigation server 204 to set-top box client 202 and receiving acknowledgment. At step 434, the server and mobile app can run alignment scripts between the known display location's precision geocodes and the handheld controller's dynamic DGPS updates, allowing the server to track what the users pointing at and to convey this information to the mobile device to allow the mobile device to update any touchscreen displays. In some embodiments, content navigation server 204 correlates the location and orientation information received from the mobile device with an environmental model that includes known locations of objects in the environment.

At step 436, content navigation server 204 can inform STB client 202 of the current portion of the screen that the mobile device points to. This can include one or more clicks where the set-top box displays selectable content. This information may be used to understand that the user has selected a button or icon when the user makes a gesture or clicks his touchscreen. At step 437, the user begins interacting with content on the display. Mobile app 201 gets motion and gesture inputs from its on-board embedded accelerometer, level, and compass modules and STB client 202 detects that a TV pointer sequence is ready. At step 439, app 201 sends display point plane coordinates to navigation server 204 to inform the server when a user has interacted with the touchscreen, such as clicking an. At step 440, navigation server 204 sends clickable screen hot zone information to the STB client 202 for rendering click zones on the TV display. At step 441, Mobile app 201 sends pointing coordinate to STB client 202 and navigation server 204. Navigation server 204 sends click zone instructions to the STB client 202. Mobile app 201 sends input/output commands to the STB client 202.

At step 443, in response to user selection using virtual pointer, STB client 202 communicates with backend content management services 205 to request content authorization for the content corresponding to the selection of the user. At step 445, mobile app 201 and STB client 202 exchange pointer clicks on information and continue interacting.

Figure 7:
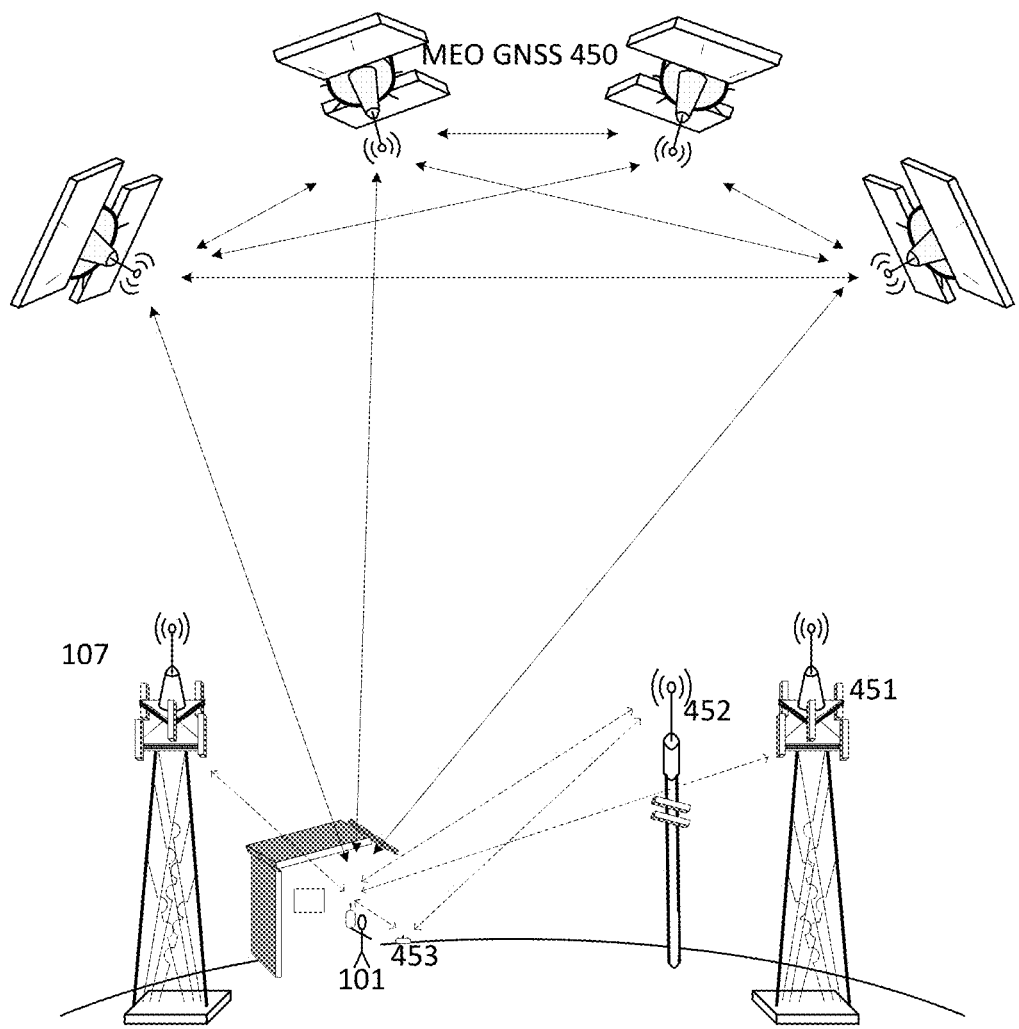
FIG. 7 is an infrastructure diagram representing some embodiments in the present invention.

FIG. 7 depicts the interaction between a mobile device and various transmitters that may be used to provide positioning information. When a mobile device initializes the remote control pointer application, the application requests that the STB client makes ready a remote pointer on the video display. The app then receives input and output commands from the user of the device. In order to provide an interactive virtual pointer experience, the mobile device 101 receives geocode updates from its onboard GPS sensors communicating with a constellation of GNSS satellites 450. This can provide a rough estimate of the position of mobile device. In some embodiments, further precision is needed to provide meaningful user experience. To provide greater precision, mobile device 101 communicates with a plurality of networking devices. This can include cellular tower 107, cellular tower 451, and cellular tower 452. These towers may use any conventional cellular communication protocol. The geocode coordinates of these fixed location towers can be established by publication from the cellular carriers operating antennae on the towers. Mobile device 101 can enhance its position information by estimating distances from these towers using TDOA (Time Difference of Arrival) and AOA (Angle of Arrival) radio frequency techniques. These distance measurements can be made by observing a time of flight of asynchronous signals, comparisons of arrival times of synchronized signals, observing angle of flight of received signals, comparisons of signal strength, etc.

For example, a cellular carrier may utilize its cellular towers to offer a value-added service, whereby the towers each broadcast a common synchronized signal at a synchronized time interval. Devices receiving this signal can compare the arrival times from the various towers, allowing the device to triangulate its location relative to plurality of cellular towers making this information useful to enhance or replace GPS information, and may be suitable for providing enough precision in the location of the estimated position of mobile device 101 to provide a meaningful user experience.

In addition, other one networking devices, such as set-top boxes with wireless antenna, and such as 802.11 wireless devices and access points 453, can be used to provide fixed location beacons for mobile device 101 to measure or estimate its position. For example, 802.11 wireless devices can use TDOA in the way cellular communications networks do, so time of flight can be used to measure the distance between mobile device 101 and access points 453. Similarly, pinging a wireless router can be useful in estimating the time of flight of signals between the mobile device and the router. Any latency in the router can be characterized by regular pings of the router. Once latency is estimated for the wireless router, the remaining time interval between sending and receiving the ping at the mobile device can be estimated as the time of flight (round trip) between the mobile device and a wireless router. This can be used to provide a distance estimate to assist in improving the accuracy of triangulation calculations for estimating the position of the wireless device.

Due to the distance of GPS satellites (Medium Earth Orbit between ~19,000km and ~23,000km) and interference to the GPS signals in space, corrections can be done to improve geo-coding accuracy using a GBAS (Ground Based Augmentation System). The US FAAs WAAS (Wide Area Augmentation System) specification, for example, provides a position accuracy of 7.6 meters (25 ft.) or better (for both lateral and vertical measurements), at least 95% of the time. Actual performance measurements of the system at specific locations have shown it typically provides better than 1.0 meter (3 ft., 3 in) laterally and 1.5 meters (4 ft., 11 in) vertically throughout most of the contiguous United States and large parts of Canada and Alaska. In Europe, the European Space Agency went operational with EGNOS in 2009 to augment the Glonass and Galileo GNSS satellite systems. A similar system in operation is the USCG's and USDOTs NDGPS (National Differential GPS) which has over 85 DGPS transmitter sites in operation and plans for deploying over 125. As of 2012, it is estimated that there are over 400 terrestrial DGPS beacons in service globally. Commercial systems include StarFire and OmniSTAR, with John Deere's SF2 introduced in 2004 achieving decimeter accuracy 95% of the time using 25 ground reference stations worldwide. John Deere also offers a StarFire RTK real-time kinematic DGPS tripod for use in agricultural settings with centimeter location accuracy.

The US DoD has estimated that DGPS accuracy degrades 1 meter for every 150 km of distance to the broadcast site. Radio propagation is further degraded by indoor transmission, so high-resolution geo-location to several centimeters of precision may be assisted with differential beacon and/or distance measurements to known fixed terrestrial radio transmitter/receiver locations within 5 km. Most GSM and CDMA cellular towers are capable of propagating signals at longer ranges but are configured to disperse signals to less than 10 km. In populated areas cellular towers are often spaced 2-4 km from each other. Public Wi-Fi access points are typically clustered closer together than cellular towers with the 802.11n outdoor range being 250 m, however the 802.11y-2008 amendment to the IEEE 802.11-2007 standard allows for use of the higher power 3,650 MHz band now being used by some wireless and broadband providers to extend Wi-Fi range to 5 km from the Wi-Fi access point. Many broadband providers now operate several thousand public Wi-Fi access points in individual metropolitan areas providing the coverage to enable using those locations for augmented GPS reference and greater high resolutions precision augmented GPS (AGPS) and DGPS geocode readings. 802.11ac, also known as 5G Wi-Fi, is the latest draft of the Wi-Fi IEEE standard, and in 2012 Broadcom and others introduced the first SoCs for new devices which can operate in the 5 GHz band. 5G Wi-Fi increases range by ~20% while increasing data rate speeds over threefold. Broadcom has estimated that, by 2015, the number of global public Wi-Fi hotspots will be approaching 6 million, allowing for cellular-like roaming for Wi-Fi enabled devices. In addition to public Wi-Fi hotspots the number of private Wi-Fi access points that could be configured as AGPS locations is already in the 10's-of-millions in most developed regions around the world.

In some embodiments, to achieve the geo-positioning resolution in the handheld device to establish the desired motion pointing and gesture sensing interface with a video screen or smart building device, the GPS signal should be augmented with traditional AGPS and DGPS methods, and then refined through a SDGPS process by communication with either a nearby DGPS beacon or a plurality of nearby known fixed terrestrial wireless transmitter/receiver (e.g., GSM, CDMA, UMTS/HSPA, 3GPP or Wi-Fi) locations with published precision geo-code centroid information accessible to the handheld. In some cases the SDGPS process and be further refined with a Real-Time Serial Multilateration (RTSM) calculation process that would culminate in replacement of the original GPS reference where four or more AGPS and/or SDGPS sites are in range. In addition, common syntax for GPS geocodes can be modified to enable real-time processing of AGPS, DGPS, and SDGPS calculations. In some embodiments, the new syntax can be used while offloading processing of those calculations to cloud-based servers. Commonly used syntax for $GPGGA (fix data) lat./long =dddmm mmmm, antennae altitude=0, M, [or] 0, f, and geoidal height=0.0, M, and for $GPGLL (geographic position) latitude=ddmm.mm, longitude= dddmm.mm. Common degree-minute conversions in database systems produce decimal-degree values (ddd.ddddd) which are too coarse for high resolution precision location measurements. Latitude and Longitude can be first converted to a common Degree-decimal-minute format with a minimum six decimal integers for computation, and elevation can be converted to meters in the 0.000 format with a minimum of three decimal integers. Several centimeters will be roughly equivalent to 0.000016 minutes depending on the latitudes where the measurements are being taken. Because altitude above mean sea level and height from geoid centroid are inherently less accurate measurements than lat./long, it is recommended that elevation be calculated at millimeter resolution for differential positioning corrections to height of the handheld device during indoor operation.

Figure 8:
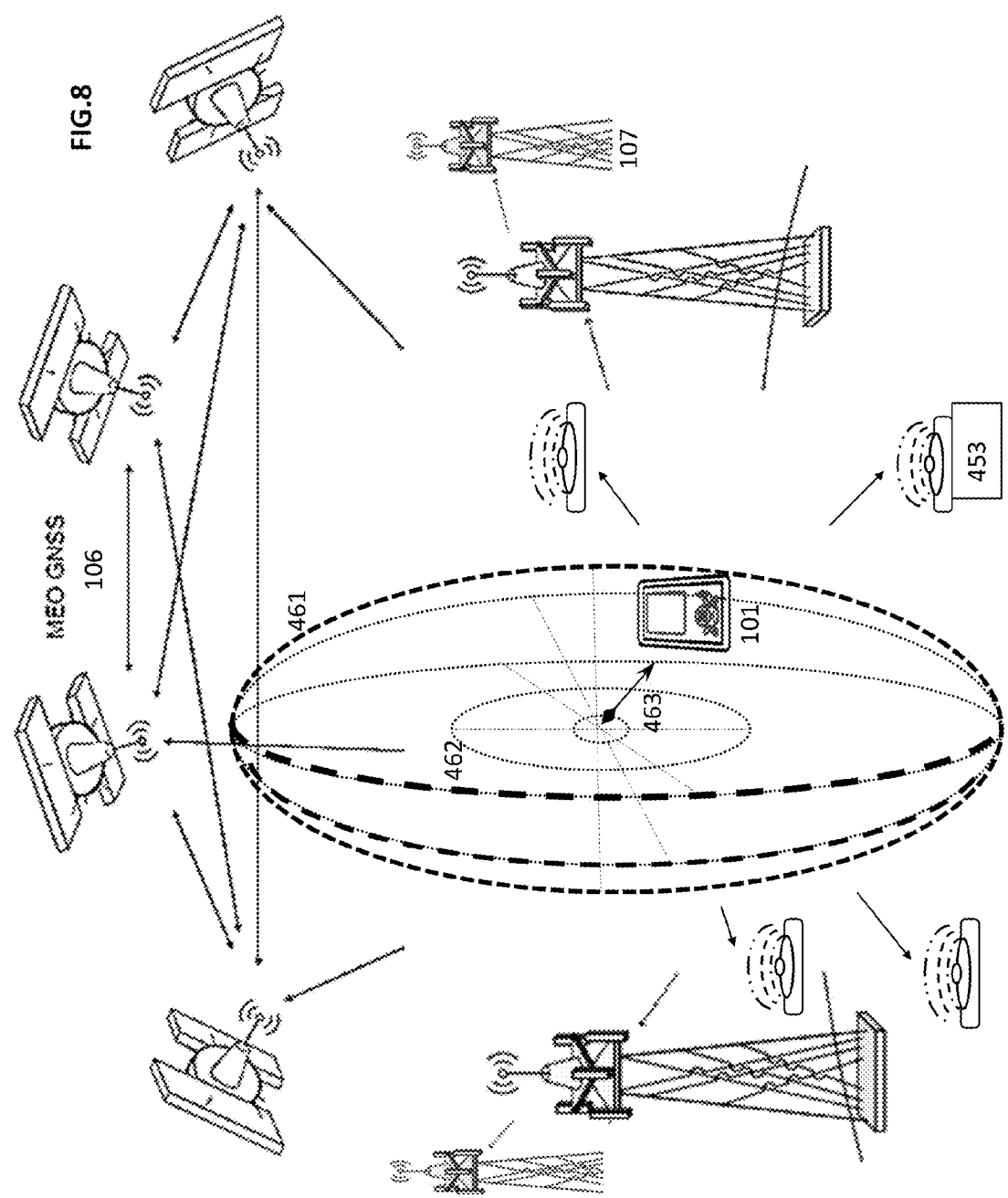
FIG. 8 is an infrastructure diagram representing positioning features of some embodiments in the present invention.

FIG. 8 illustrates an example of refining the location of mobile device 101 for use with some embodiments. At start up, a mobile app accesses GPS modules in the device to get geo-location coordinates from an initial fix on GPS signals provided by GNSS constellation 106. This first fix can be accelerated using aGPS (assisted GPS) data sets stored in a cloud or on the mobile device in persistent memory. This can produce a geo-location accuracy of several meters horizontal and tens of meters vertical. The accuracy range of GPS is illustrated by elliptical sphere 461.

The mobile app requests AGPS (augmented geocode values using GBAS techniques) geocode updates from the device's onboard embedded GPS module communicating with the GNSS satellite constellation and commercial DGPS systems. This second step of geo-code refinement may produce a refined geo-location, in some embodiments, producing an accuracy of +/−1 meter horizontal and several of meters vertical (refined elliptical sphere 462) with minimal processing.

Next, the mobile app identifies cellular towers (107) in range and wireless access points (453) in range, and determines radio frequency transmission time differential measurements between the handheld antennae of the mobile device and each transmitting radio antennae in range (of the towers and access points 107 and 453) and ranks the closest antennae with the objective of logging four or more wireless or cellular access points within a threshold distance, such as 4 km. The mobile app searches for active DGPS beacons. If any are, within a satisfactory distance range for precision calculation of high resolution geocodes, the SDGPS process is invoked, which may leverage cloud-based calculation processing, to produce high-resolution precision geo-codes for the device in real-time. An RTSM technique, such as shown in FIG. 15, can also be used to further refine the high resolution localization of the mobile device. These higher resolution geocodes can be represented by further refined elliptical sphere 463.

If no DGPS beacon is in the desired range (~300 km using) the mobile app then requests information from the closest transmission sites to indicate if any are registered passive high-resolution DGPS reference sites with accessible known location data. If any are, the SDGPS process is invoked, which may leverage cloud-based calculation processing, to produce high-resolution precision geo-codes for the device in real-time.

If none of the transmission sites in range are registered passive high-resolution DGPS sites with accessible known location data, the SDGPS process utilizes non-precise location data to produce high-resolution geo-codes for the device in real-time, which can be manually verified by the user for usability. For example, the mobile app may request that the user place the mobile device at a known location, such as a corner of a coffee table. The geocode calculated using the SGPS process can be compared to that known location and an offset applied to correct any error. It should be appreciated that manual verification may not be required each time user starts up the mobile app, but may be helpful when sufficient DGPS signals are available.

In instances where the non-precision real-time high-resolution geo-codes calculated for the device and/or by the Mobile App on the device are insufficiently accurate to provide a desired user experience (such as +/−5 cm, in some environments), a nearby Wi-Fi access point can be configured as an active DGPS beacon, or more than one nearby Wi-Fi access points can be configured as passive high-resolution DGPS reference sites. Furthermore, in buildings with poor radio propagation, local active DGPS beacons may be added.

Figure 9:
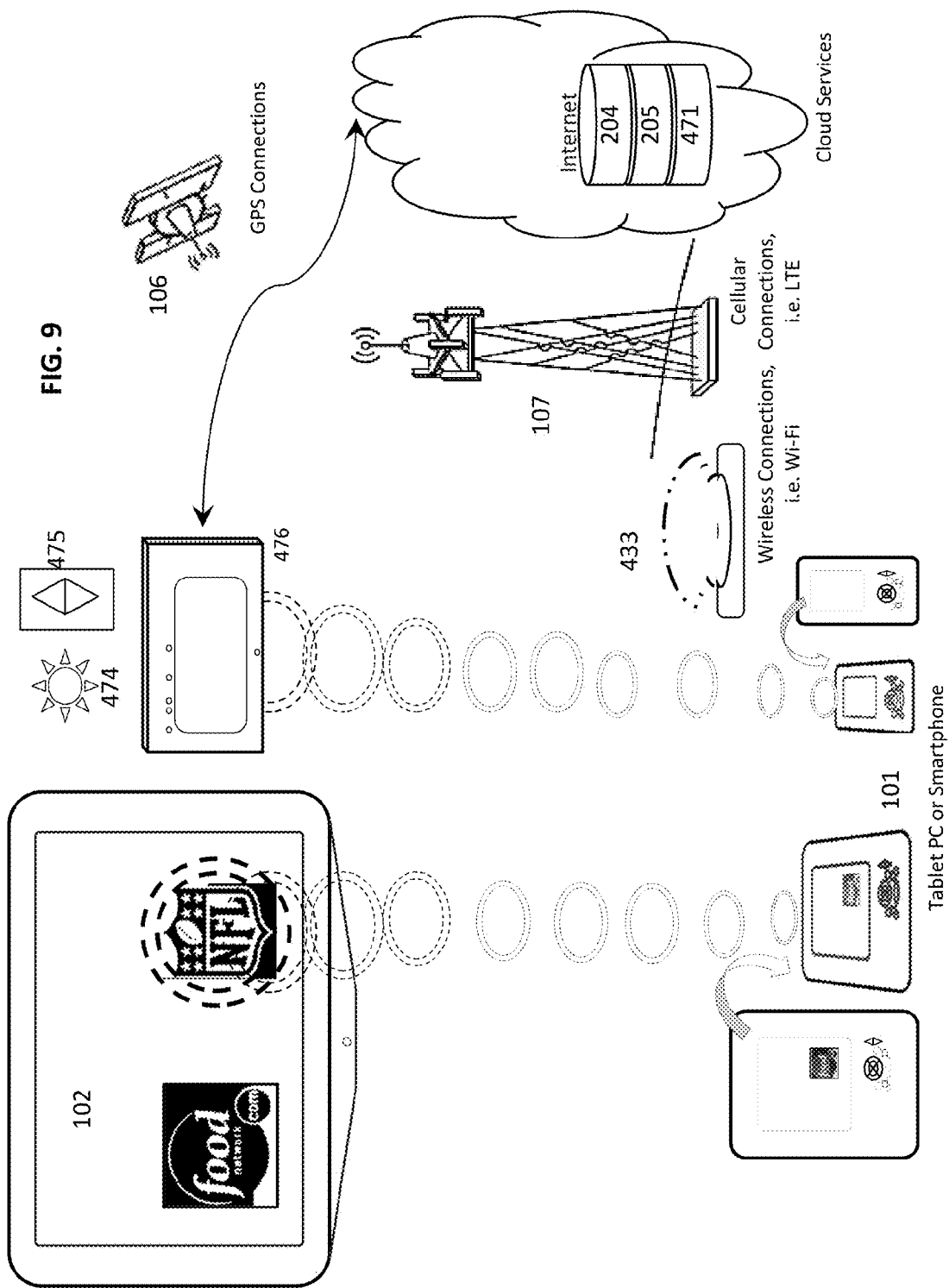
FIG. 9 is a component diagram of the system hardware and devices used in some embodiments of the present invention.

FIG. 9 depicts an exemplary system 470 that allows a user to utilize the virtual pointer system to provide interactive functionality with interactive objects in the environment. These can include non-display devices, such as home automation devices or security systems. Other interactive devices will be readily apparent to one of ordinary skill in the art. Interaction with these interactive devices may be in addition to interacting with a video display. For example, a user may have a smart home that includes a flat screen TV and many automated systems, such as environmental controls, lights, security panels, etc. In some embodiments, interactive devices may utilize Z-wave protocols to communicate with home automation servers.

One or more mobile devices 101 can utilize an application to establish a virtual pointer connection with video monitor 102, as well as connections with interactive devices, including light bulb 474 that may be controlled by a light switch, light switch 475, and security and automation panel 476. The virtual pointer connections can be established using any of the methods described herein.

An app on one of the mobile devices 101 can access position orientation information from onboard motion, position, and location sensors, e.g., accelerometer, magnetometer, gyroscopic sensor, and GPS, for accessing position orientation, location, and motion information relative to the mobile device. The app then initializes and accesses location data from the GPS module's initial first fix obtained by measuring radio signal time of flight distance to multiple GPS GNSS satellites 450 for trilateration. Assisted GPS (aGPS) location data can be accessed from a remote datastore 473 to speed time to first fix and improve accuracy and resolution of first fix geocodes (latitude/longitude/altitude). The app then identifies the closest cellular tower radio antennae (107) and wireless data access points (453) (e.g., network devices). For additional refinement and high-resolution calculation of location information using trilateration based on radio signal time difference of arrival (TDOA) and further geo-location refinement using triangulation based on angle of arrival (AOA) of radio signals exchanged between device 101 and these network devices. The mobile app then accesses augmented ground based GPS (GBAS) location data and additional Differential GPS (DGPS) processing resources to calculate highly accurate high-resolution geo-codes for mobile device 101. An app operating on the mobile device can utilize server resources 204 and 205 as described throughout.

A mobile app on the mobile device 101 then identifies nearby interactive devices, such as television screen 102 or interactive devices 474, 475, or 476 that are pre-registered with known high-resolution geocode locations for pointing and motion sensing interaction using the calibration techniques described throughout. The mobile app can also be used to register accurate high-resolution geocode locations for new interactive devices with unknown locations.

Figure 10:
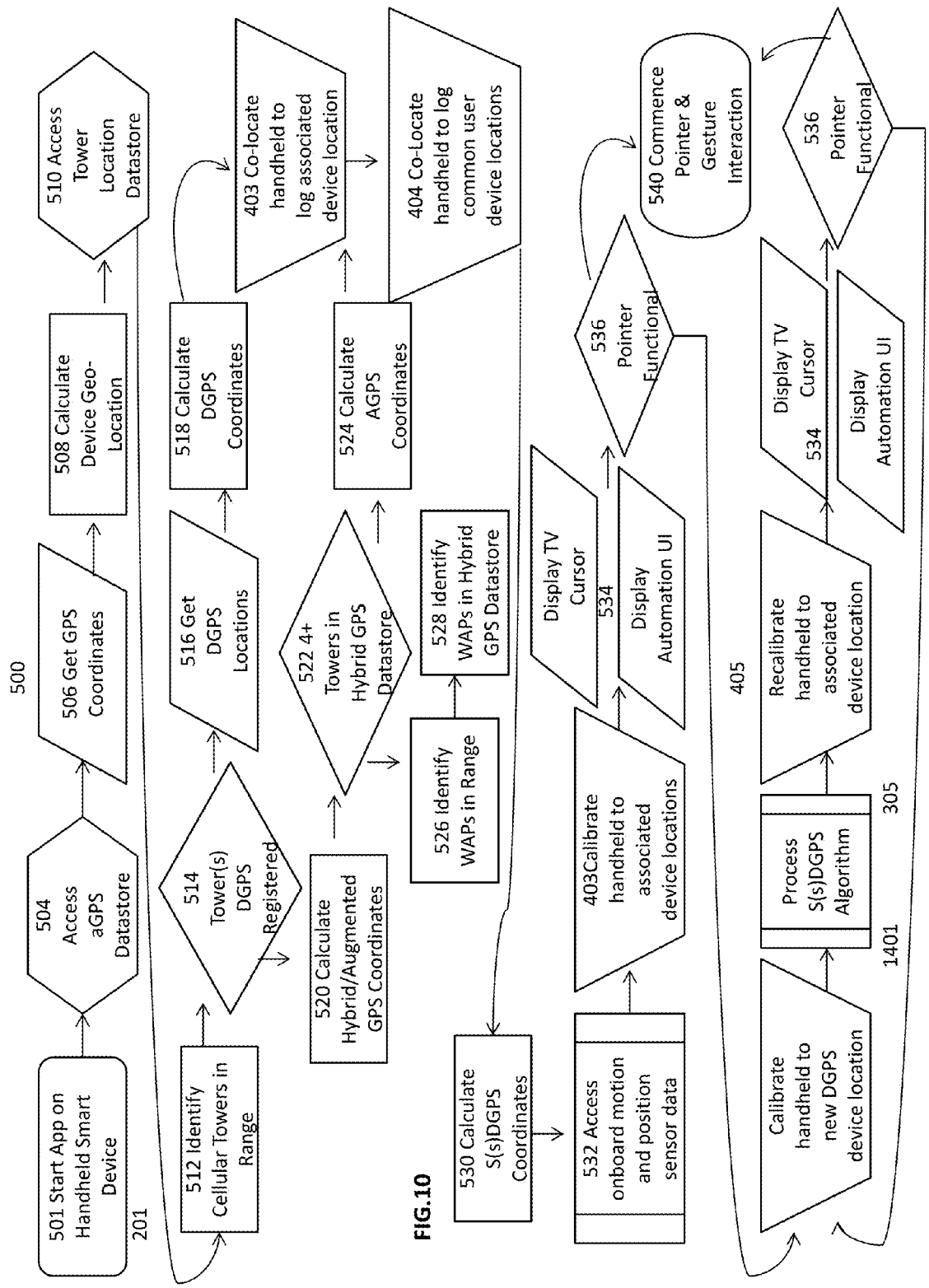
FIG. 10 is a logic flow diagram of the display setup and calibration used in some embodiments of the present invention.

FIG. 10 depicts a flowchart of the operation of a remote pointer system that utilizes the refinements depicted in FIG. 8. Method 500 includes the initial steps that can be used when a user first uses the mobile device including any calibration of the device and of the environmental model. At step 502, a mobile app on a mobile device initializes when the device is turned on or application is selected. At step 504, the mobile app accesses assisted GPS (aGPS) data stores, which may be provided by cloud-based services. At step 506, the mobile app gets GPS coordinates using the mobile devices GPS receiver. This may be derived from GNSS signals. At step 508, mobile app calculates a geolocation for the mobile device from the GPS coordinates received from the GPS receiver. In some embodiments, this step may be performed using a cloud-based service to offload the mobile devices processor.

Once a rough GPS approximation of the position of the device has been calculated, at step 510, the mobile app can access a database of tower locations. These tower locations may be provided by third-party service or by the carriers that operate the towers. This database may be a remote database stored in the cloud. Using the mobile device's antenna, at step 512, nearby cellular towers can be detected. The location of these towers in physical space may be retrieved using the database. The database of tower locations may also include capabilities of the towers, including an identification of whether or not each tower has been registered as a high resolution geocode reference site or enabled for active GPS beacon capability. At step 514, software determines which of the nearby cellular towers has DGPS capability. This determination may also be made based on signals broadcast by each the GPS beacon.

If a sufficient number of nearby towers are registered as DGPS reference sites, the app may proceed to step 516 where it determines the locations of these the GPS beacons. This may be encoded in the DGPS signals or maybe accessible in a remote database. At step 518, the DGPS locations and received signals can be used to calculate the GPS coordinates that may have higher resolution or accuracy than the assisted GPS coordinates determined from satellites.

If there are an insufficient number of nearby towers that are registered as DGPS reference sites, a mobile app may still use the locations of these cellular towers to provide augmented GPS (AGPS) coordinates. For example, TDOA distance calculations can be utilized to determine a position relative to a plurality of towers. Typically, AGPS coordinates require having access to at least four tower locations. At step 522, the app determines whether or not it has a sufficient number of towers providing signals used by an AGPS algorithm. If so, at step 524, AGPS coordinates are calculated. If not, or if there are a sufficient number of wireless access points nearby that may be used to provide refined a GPS position information, at step 526, the mobile app identifies the wireless access points that are in range. This can utilize the Wi-Fi antenna of the mobile device. At step 528, the locations of the detected wireless access points can be retrieved from a data store which may be part of the mobile app or maybe provided by cloud-based service, or a combination of the two. For example, a user may register the location of his home Wi-Fi router with his mobile app. Similarly, service providers may provide wireless access points that may be accessed by customers. Service providers may record positions of these access points to be shared with a data store for the app to lookup the locations of wireless access points. Using this wireless access point location information, as well as signals received from the wireless access points, AGPS coordinates can be calculated at step 524.

Once DGPS and/or a GPS coordinates are calculated, method 500 proceeds to step 403. At step 403, a user calibrates the location of interactive objects, such as a display, as shown in FIG. 4. It should be appreciated that the interactive object need not be a display. Whereas a display may have multiple points to indicate the orientation and extent of planer surfaces, interactive objects/devices such as lights, light switches, thermostats, security panels, automation panels, etc. that may be IP enabled or in communication with a home automation server, may also be calibrated. These interactive objects may be defined by a single point in space, such as the location on a wall where a switch or panel is mounted or the location in a room where a lamp is located. Once interactive devices have been defined in step 403, in some embodiments, method 500 proceeds to step 404. At step 404, a user may define preset, commonly used positions in the room to assist the mobile app in learning those positions and the orientations for the mobile device when interacting with one or more interactive devices. Step 404 is described with respect to FIG. 4.

Once the GPS coordinates for the device are calculated and interactive devices defined in calibrated in the physical space, method 500 proceeds to calculate SDGPS coordinates, as explained throughout. FIG. 15 provides exemplary details for a method for calculating SDGPS coordinates using RTSM. At step 532, mobile app on a mobile device accesses onboard motion and position sensor data to begin tracking motion and determining the orientation of the device. Once the app has access to the sensors, the method proceeds to step 405 as explained in FIG. 4. The user is instructed to point the mobile device at various locations in the room, including the positions of interactive devices. This allows the system to calibrate the positions in orientations of the mobile device with respect to these interactive devices. At step 534, the display of the mobile device displays a user interface that reflects the type of interactive device that it is pointing at. For example, if a mobile device is pointing at a video display, the set top box connected to the video display may display a cursor on the video display that tracks the movement of the mobile device or provides guidance to the user to guide him through the calibration process. In some embodiments, additional information may also be displayed on the touch screen of the mobile device. When the user points the mobile device at a non-display interactive object, such as a security panel, a user interface is displayed on the mobile devices touchscreen. This may include providing a copy of the keypad on the device, allowing the user to punch in a security code.

At step 536, the app on the mobile device determines if the device is now calibrated and is ready to be used as a virtual pointer. If so, method 500 proceeds to step 540, where the user begins using the device as a virtual pointer. In some embodiments, during future uses, the system may skip steps 403, 404, 405 and 532 through 534, as these steps may be most useful during a calibration and setup phase. If the system is not sufficiently calibrated to be used as a virtual pointer, method 500 proceeds to step 542. At step 542, software attempts to calibrate the device to a new DGPS device location. In some embodiments, this may be done by instructing the user to place the device at a known location, such as a corner of a coffee table or at the location of a predetermined sticker or RFID tag to restore the DGPS coordinates of the device to a known location. From there, the device may have improved accuracy and precision in positional placement by using other sensors, such as accelerometers and compass sensors to assist the GPS system in determining a relative offset position from the baseline location. This may be helpful where interference or indoor obstructions prevent achieving an accurate GPS signal.

At step 544, the mobile app proceeds to process the RTSM position algorithm to track and improve the positional accuracy of the device. From there, method 500 proceeds to a recalibration phase whereby steps 403 and 405 may be repeated to further calibrate the location of interactive devices. From there, the method repeats steps 534 and 536 to provide a user interface to the user and to verify pointer functionality before commencing gesture and pointer interaction at step 540.

Figure 11:
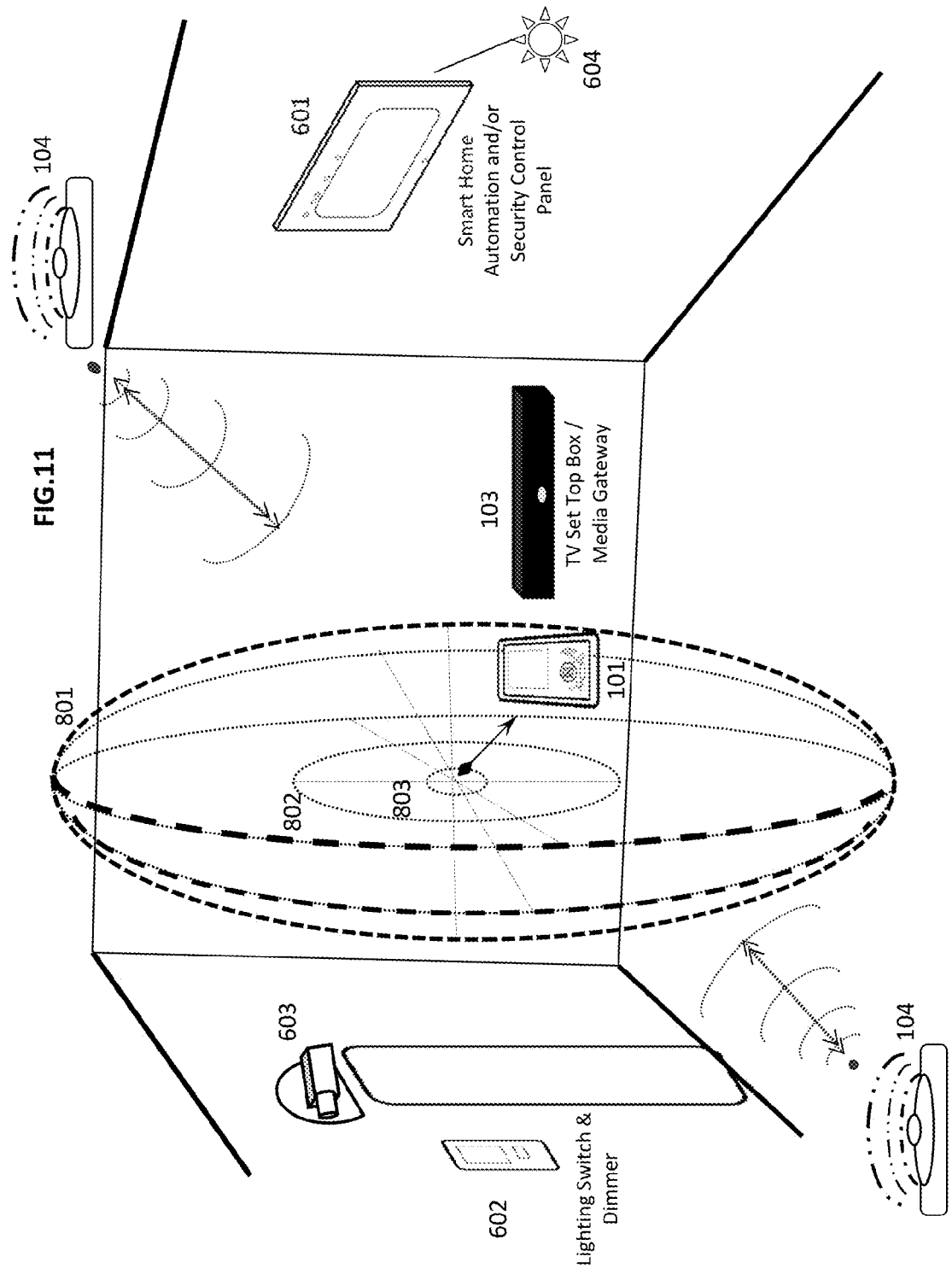
FIG. 11 is a component diagram of the system hardware and devices used in some embodiments of the present invention.

FIG. 11 illustrates the usage case where mobile device 101 can be used in an indoor environment to interact with a video display and other interactive devices. Device 101 can be located into spheres 801, 802 and 803, as described with respect to FIG. 8. In addition, mobile device 101 can use additional Wi-Fi localization details to maintain its high-resolution geocode reference, correcting for interior radio signal interference and loss of GPS or DGPS signals. A mobile app on mobile device 101 can measure time difference of arrival (TDOA) of the signals received from nearby wireless access points 104. Distance measurements may also include measuring a time of flight for ping responses sent to/from these wireless devices, or other wireless devices in the network, such as wireless set-top boxes (such as 103), or may include monitoring signal strength of these access points (e.g., reading Wi-Fi RSSI signal strength information), which can be used to measure distance based on Wi-Fi signals' known loss characteristics. In some embodiments, a learning algorithm on mobile device 101 can learn of the signal loss characteristics of the Wi-Fi devices in an indoor environment the more a user uses the mobile device in that room, by comparing other location calculations, such as accumulating accelerometer readings to measure relative distances. In some embodiments, multiple indoor wireless access points 104 can be added to improve indoor performance. In areas with poor wireless coverage, where increased localized performance and accuracy enhancement is desired, a local wireless access point 104 can be configured as a DGPS beacon.

An app running on mobile device 101 accesses a GPS module on the device. In some embodiments, the app may also communicate with GPS modules on other devices, such as a GPS module in communication with a local server running, for example, on the set-top box/media gateway 103. In some embodiments, the app on mobile device 101 sends raw location data to a server that may be remote across the Internet or on set top box 103. This may allow the mobile device to offload certain processing tasks to a more powerful processor to allow greater processing of GPS, AGPS, DGPS, and SDGPS position information. In some embodiments, the mobile device may get its first fix geolocation coordinates 801 within about a second. The mobile device may then the track aGPS coordinates in near real-time. Augmented GPS (AGPS) can refine the indoor geocodes 802, while SDGPS processing generates higher precision geocode coordinates (803) in the indoor environment in real time once a lock is established. The mobile device and its mobile app are now ready to interface with numerous nearby interactive devices, including video displays, smart home automation and/or security panel 601, smart home lighting switch and dimmer 602, smart home security camera 603, or other devices controlled by a home automation server, including lamp 604.

Figure 12:
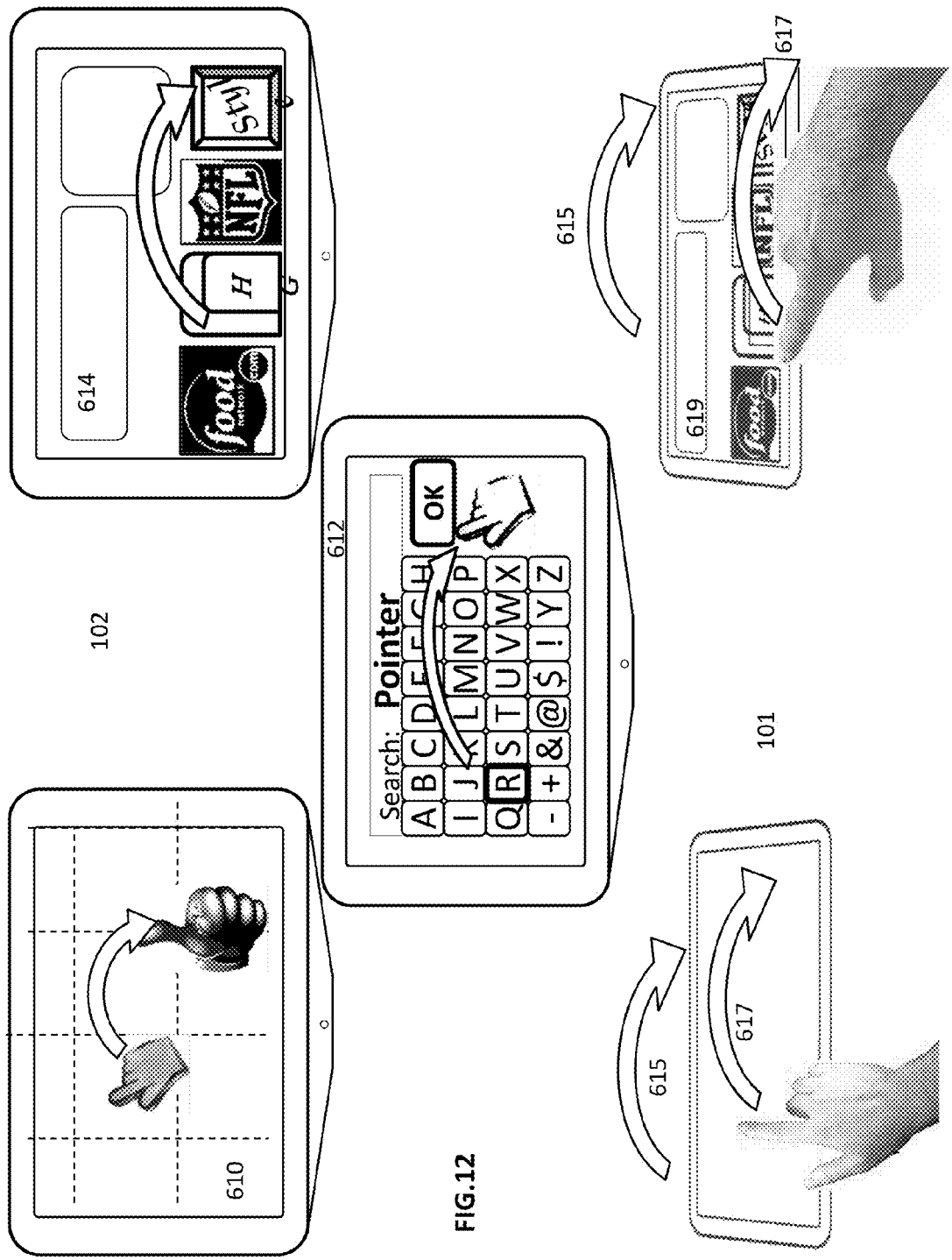
FIG. 12 is user interface diagram illustrating some interfaces for use with some embodiments of the present invention.

FIG. 12 illustrates various gestures that may be used by users with some embodiments. Three instances of the display that may be provided on video screen 102 are illustrated, 610 which shows icons reflecting the gesture detected, 612 which shows a virtual keyboard that allows the user's gestures to type in information, and a menu 614, which shows the user selecting various programming from a menu using gestures. In this example, gestures can be made via mobile device 101 by either moving the device in a swiping motion, such as motion 615 or by swiping a finger on the touchscreen of device 101. In some embodiments, the screen of mobile device 101 may also include a user interface 619 that mirrors or supplements a menu on video screen 102, such as menu 614.

In a first example, the user points mobile device 101 at TV screen 102 to activate a cursor pointing icon shown in UI 610. The user swipes the touchscreen (617) to move the cursor pointing icon on the TV display, and she may also move the handheld in a swiping gesture (615) to move the cursor pointing icon on the TV display. She may then tap the touchscreen to select OK, and also has the option to use an OK gesture motion by moving the handheld device in space.

In another example, pointing mobile device 101 at the location of TV display area (such as UI 614) can invoke a duplication of the graphical user interface (GUI) icons on the display of the handheld wireless device (619). The user then swipes the touchscreen (617) to scroll through graphical icons on the TV display and on the handheld wireless device display simultaneously. She may also move the handheld in a swiping gesture (615) to scroll through graphical icons on the TV display and on the handheld wireless device display simultaneously. Navigating media content on a television display is often a social behavior among couples or groups, and in this User Experience (UX) configuration, illustrated as replicating the graphical user interface (GUI) icons on the display of the handheld wireless device (619), the members of the viewing audience group that are not holding mobile device 101 have complete visibility and observation of the content icons being navigated and displayed on the mobile device 101.

In another example, a user can also interacts with a duplication of the graphical user interface (GUI) icons on television display 102 and the mobile device. In some embodiments, multiple mobile devices can be used, allowing multiple users to simultaneously interact with the screen. Multiple users may be enabled for point-to-interact functionality with the content navigation User Experience (UX) displayed on the TV screen.

The graphical user interface may be displayed with multiple motifs for point-and-click interaction mimicking touchscreen functionality from across the room. The user may sit in lean back posture with her handheld wireless device in hand and point at clickable buttons on the TV display, e.g., alphanumeric buttons for entering a search string. The User Experience (UX) functionality can be integrated with other readily available inputs i.e., voice and speech recognition via the microphone in the handheld wireless device so that when she says the word "search", the Search Screen in the UI (612) is invoked on the TV display. In some embodiments, she may also say a search term, such as "pointer," allowing the search string field to be quickly populated. If the speech recognition software mistakenly interprets the word and populates the search string field with the word "Painter", the user can then quickly and easily point the handheld wireless device at the TV display area where she can point-and-click the incorrect spelling in the search string to modify the search string with a few quick pointing and touching motions and gestures to correct the search input and then select OK to execute the keyword search.

Figure 13:
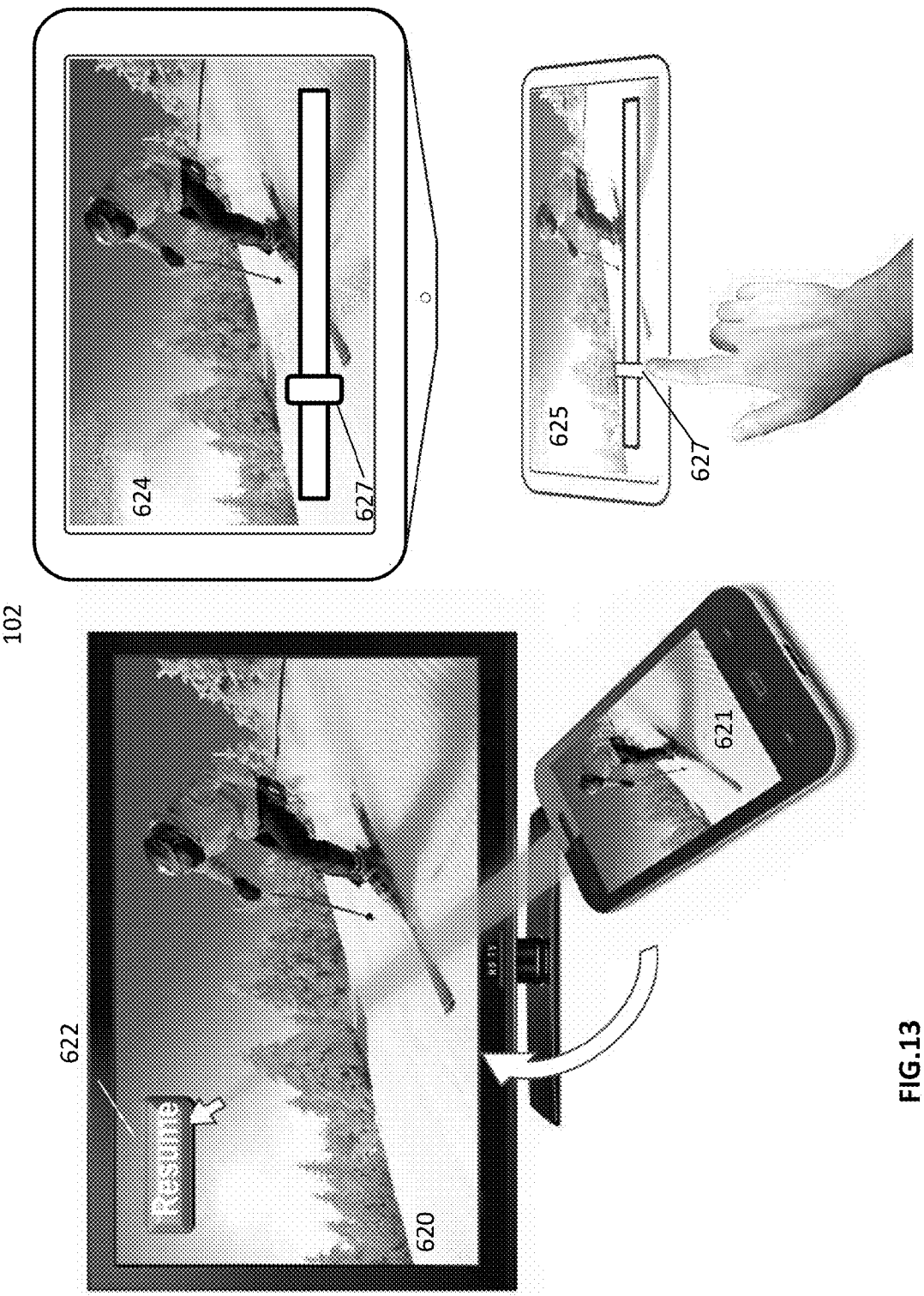
FIG. 13 is user interface diagram illustrating some interfaces for use with some embodiments of the present invention.

FIG. 13 illustrates how a user can use some embodiments to interact with video playback on a video display. In one example, when a user is watching a video stream on the mobile device 101, she may point the mobile device 101 at the TV screen 102 to transfer or replicate the video feed on the TV screen 102 and an icon 622 for user input can be displayed on an overlay on the video feed 620. She may select that icon to continue viewing the video feed on the TV screen from the same spot in the frame sequence as was playing on the handheld wireless device.

In another example, a user employs a flip motion gesture to request display of a linear video channel or on-demand or recorded video content feed displayed on the handheld wireless device to be displayed on video display 102. The user then points to click the 'Resume' button 622 to continue watching the same video program from the same frame sequence in the source video on TV display 102 that she has playing on the handheld wireless device 101.

Pointing the handheld wireless device 101 at the location of TV display area including that of a video projection screen location can be interpreted as a motion and gesture command that invokes a duplication of the graphical user interface (GUI) icons on the display of the handheld wireless device. Onscreen icons based on click-and-hold interaction (e.g., the video scrubber bar 626) can be replicated on the handheld wireless device (e.g., as video scrubber bar 627) so that functionality is extended to the television screen, and specific gestures (e.g., rotate up) can invoke key video watching commands (e.g., pause, play, and stop video). The user employs a touchscreen click-hold-and-drag motion on the handheld wireless device to control the DVR scrubber bar icon on the TV display for slider control over pause/fast-forward/rewind DVR functions.

Figure 14:
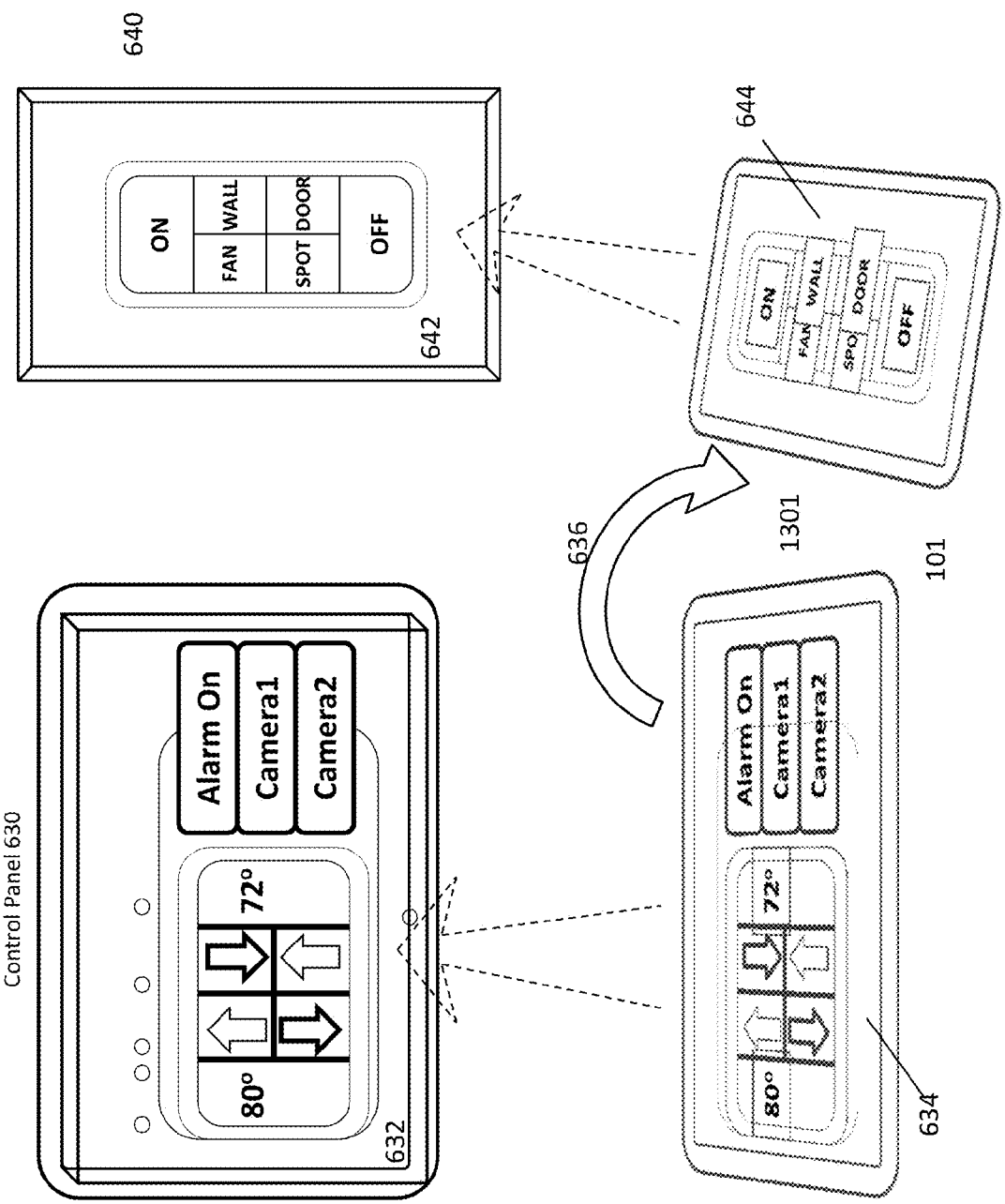
FIG. 14 is user interface diagram illustrating some interfaces for use with some embodiments of the present invention.

FIG. 14 illustrates how a user can use some embodiments to interact with non-video interactive devices, such as IP-enabled security systems that interact with a home automation server or have home automation server software embedded that allow the security system to be remotely controlled and/or remotely control other devices, such as electrical outlets or lights. Pointing the handheld wireless device 101 at smart control panel 630, allows the mobile device to be configured as a motion and gesture command device that invokes a duplication of the user interface presented on the smart control panel (UI 632, replicated as UI 634). The replication of the UI 632 and 634 need not be an exact replica. For example, UI 632 may include a touchpad having more or less functionality than an icon-driven touch screen UI 634 on device 101.

Changing the orientation (such as by movement 636) of the handheld wireless device to be directionally and tilt angle aligned with the known location of smart light switch 640 by the user can invoke a command to activate a duplication of the user interface 642 presented on the smart light switch. The user now uses the touchscreen interface 644 of the handheld wireless device to interact with the buttons on the light switch. Again, the replication can be functional, rather than stylistic, allowing some or all buttons to be replicated on the mobile device to allow the user to operate the switch from her mobile device.

FIG. 15 illustrates the algorithmic logic flow of calculation instructions used to implement RTSM localization in some embodiments of the present invention. The steps shown in FIG. 15 may be carried out by an app on mobile device 101, server software on a remote server or a set-top box, or any combination thereof The diagram represents a computational process that may be ongoing and repeating during the operation of the mobile app 201. The calculations are described as a Real-Time Serial Multilateration (RTSM) algorithm. At step 650, client software 201 (described as a pointer app) initiates the RTSM algorithm to refine precision high-resolution geocodes for the localization of the mobile device 101. At step 653, the software gets geocode inputs for the location of the mobile device 101 in the form of either DGPS corrected geocode coordinates, or AGPS geocode coordinates that have been refined with coarse localization techniques using Time of Arrival measurements for radio signal transmissions to one or more cellular towers within range. The resolution of the input coordinates are expected to be 1 meter vertical and roughly 0.3-1.0 meters horizontal depending on the latitude at the location of the measurements, with an accuracy of plus-or-minus 5 meters. At step 656, the geocode values are converted into a high-resolution format for four key coordinate variables plus one supplemental variable; latitude (ddmm.mmmmmm), longitude (dddmm mmmmmmm), Altitude above mean sea level (m.mmm), Height above geoid centroid (m mmm), and Elevation above ground level (m.mmm) The coordinate conversation in step 656 normalizes for inconsistencies in the formatting of input values sourced from multiple aGPS and AGPS, including DGPS and SDGPS, systems and processes, and adds decimal places for granularity down to millimeters of localization resolution, along with adding placements for one to two key variables that will assist with determining a precise elevation of the mobile device 101 during operation of the mobile app 201.

At step 659, the calculations use a predefined process that accesses stored data and additional inputs to begin high-resolution refinement of the geocodes for real time localization on the mobile device 101. The process cross references a stored terrain elevation model to initially populate the Elevation field based on the Latitude and Longitude inputs, and if the Height value is null accesses a stored geoid model of the earth to populate the Height field based on the Latitude and Longitude and Altitude inputs. Altitude and Height are the least accurate of the GPS-based coordinates used for inputs, and precision high-resolution Elevation measurements are valuable to the operation of the mobile device 101 pointing mechanism in three dimensional space, so in some embodiments a serial learning algorithm is employed to reduce variance in the accuracy of the Elevation values used in the RTSM algorithm.

Once the five variables in step 659 (X, Y, Z, H, E) have been populated, in some embodiments the predefined process invokes a triangulation calculation to refine the values for better accuracy based on distance measurements to cellular towers within range using TDOA (time difference of arrival) of the radio frequencies send from the mobile device 101 to the cellular tower site 107. In some embodiments the predefined process' triangulation calculation also accounts for angle of approach measurements to cellular towers within range using AOA (angle of arrival) of the radio frequencies sent from the mobile device 101 to the cellular tower site 107. At completion of step 659 the accuracy of the geocode measurement can be better than ~2 meters horizontal and ~3 meters vertical.

At step 662, the RTSM algorithm applies a bounded range filter, the 1$^{st}$ Standard Deviation Filter in the RTSM algorithm, on the set of the (X, Y, Z, H, E) variable combinations identified by the calculations in step 659 as viable high-resolution location possibilities for the time period of the localization measurement which may be within a specific 50 millisecond time sequence. The standard deviation filter creates a bounded range across the sample set of geocode combinations to eliminate outlier values that may have been introduced by signal noise or interference with the radio signals used for distance and angle measurements.

At step 665, a first multilateration calculation is applied to the mobile device's 101 radio communications with cellular towers within range using TDOA. Multilateration is a common technique in radio navigation known as hyperbolic navigation. Multilateration does not require a common clock, and the difference in the signal timing can be measured with an oscilloscope to determine absolute distance between radio transmitter and receiver, however multilateration does require one radio transmitter to be in radio communication with four or more radio receivers during the time frame of the localization measurements to determine a location in three dimensional space. Multilateration can be more accurate than triangulation, but can also be more computationally intensive, because it calculates and the intersection of at least three hyperboloid geometries in three dimensional space. In some embodiments, the mobile app 201 sends and receives only the values used for multilateration computations to a server to offload processing of the calculations used in the RTSM algorithm. At completion of step 665, the accuracy of the geocode measurement can be better than ~1 meter horizontal and ~1.5 meters vertical.

At step 668, a second multilateration calculation is performed based on the mobile device's 101 radio communications with wireless data access points 453 within range using TDOA. Multilateration using Wi-Fi benefits from four or more wireless data receivers at known locations within range of the mobile device 101. In some embodiments wireless access points can be added with a registration process that publishes their known location in high-resolution geocode format for reference in the localization process using the RTSM algorithm. At completion of step 668, the accuracy of the geocode measurement can be better than ~0.5 meters horizontal and ~1 meter vertical.

At step 671, a third multilateration calculation is performed based on a combination of the mobile device's 101 radio communications with cellular towers within range and with wireless data access points 453 within range using TDOA. In some embodiments both types of radio receivers (GSM or CDMA, and Wi-Fi) are included to complete the necessary four or more receivers needed for a single multilateration calculation. In other embodiments, TDOA distance measurement accuracy attributes are applied to each receiver site used in the multilateration calculation based on the radio propagation characterizes of the local environment, and the wireless signal type and frequency used by each receiver. At completion of step 671 the accuracy of the geocode measurement can be better than ~0.1 meters horizontal and ~0.3 meters vertical.

At step 674, a stored procedure applies bounded weightings to the samples collected and logged for the time period of the localization measurement. In some embodiments a Cramér-Rao bound or similar bounded range is used to apply probability weightings to the viable accuracy of the high-resolution geocode combinations collected in steps 665, 668, and 671.

At step 677, a second stored procedure is used to analyze the samples and weightings logged through step 674, and then apply historical learning to the accuracy parameters to expresses upper and lower bounds on the variance distribution of the localization geocode combinations to produce a resulting probabilistic geocode for the time frame of the localization measurements.

At step 680, a rule is applied to the result from step 677 based on the probability confidence in the geocode coordinates produced for the localization of the mobile device 101 in the sub-one-second real time duration of the measurement for variances within plus-or-minus 1.5 cm vertical and horizontal. In some embodiments the rule can be modified for higher or lower localization resolution or accuracy, or coarser or narrower time durations of measurements, depending on the use cases of the user interactivity and usability factors of the mobile device's 101 pointing and gesturing user interface. If the rule in step 680 is passed, the geocode result is deemed sufficient for the use case and is passed on for output.

If the rule in step 680 is not passed, additional serial calculations through the learning algorithm may be needed to generate the usable result(s). In step 686, clock synchronization is applied to the TDOA, which may be at the sub-nanosecond level of granularity. For radio communications within the same network, clock synchronization is more practicable. While multilateration does not require clock synchronization, nanoseconds of clock drift from one set of receiver time differences to the next can cause multiple centimeters of variance in the result. Electromagnetic environmental conditions can also change at the millisecond and nanosecond levels adding variance to the results. Clock synchronization is an additional supplemental step in the RTSM algorithm that adds accuracy at high resolutions, and can generate additive samples for use in the learning algorithm that can improve estimation of a deterministic parameter. In some embodiments, clock synchronization is used to improve the user experience.

At step 689, a determination is made regarding which radio receivers are eligible for clock synchronization. If cross-network clock synchronization is available, meaning that Wi-Fi and Cellular radio receivers are connected to the same or interconnected carrier networks in a way that allows for or enables clock synchronization across both the cellular and wireless data networks, then the process for calculations returns to step 665, Multilateration1 starting again with signaling across the cellular network and progressing through steps 668, and 671 to sample TDOA signaling on also the wireless data network, and finally a hybrid combination of both cellular and wireless data receivers. If clock synchronization is not available, or is only available in one portion of the local wireless network, then the process for calculations returns to step 668, Multilateration2 sampling the local wireless data, and step 668 inserts those results into step 674 for enhancements to the bounded weightings. If after a second set Multilateration geocodes have been generated the results provided by step 677 still fail step 680, additional attempts can be made passing through external procedure 692.

Step 692 represents procedures that are external to the RTSM algorithm that address limitations in the local environment wireless infrastructure that might be temporary, intermittent, or require modification. Solutions for these limitations may or may not be achievable within the real-time duration of the measurements, described in some embodiments at <50 milliseconds. Examples of some of these external procedures are upgrading some of the radio receiver sites within range to use high-resolution geocode formats, identifying additional radio receiver sites within range that do not have known published locations and looking up approximate location references for them, or requesting the known locations of those sites be published, or adding known location information to those wireless sites in a database or in their manifest. Continuous processing of the RTSM algorithm while these external procedures are followed can increase the algorithm's learning of the natural features and radio frequency physics of the local environment making that outputs at step 683 are generated. In some embodiments non-real-time outputs at step 683 that are performance constrained while the external procedures 692 are followed may be used to set-up or calibrate the overall system prior to operation by the end user. In other embodiments that do not require real-time localization, the overall system may be operated using the outputs from step 683 as they are generated. In still other embodiments the RTSM algorithm is an optional augment to the already available DGPS and AGPS coordinates to the wireless device 101.

In step 695, the timestamps of the last two results generated as output in step 683 are compared to see if they occurred more than 40 milliseconds apart. If they did, the RTSM algorithm process is repeated, whenever in real-time operation using the mobile app 201 for pointing and gesturing interaction. If they occurred within 40 milliseconds of each other, the calculations wait at step 698 until the next iteration.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. For example, references to Wi-Fi are intended to refer to current 802.11 standards, as well as future variations, including other wireless IP protocols. It is therefore intended that the appended claims be construed to cover all such equivalent variations as fall within the true spirit and scope of the invention.

What is claimed is:

1. A system for remotely interacting with a video display, comprising:
   non-transitory computer-readable instructions for configuring a processor of a handheld wireless device, the handheld wireless device being separate from the video display, the processor of the handheld wireless device determining position and orientation information about the handheld device based on sensors onboard the handheld wireless device and sending the position and orientation information across at least one wireless network;
   and at least one remote server configured to receive the position and orientation information and to determine the orientation of the handheld wireless device relative to the video display based on the position and orientation information received from the handheld device and a model of the environment around the handheld wireless device,
   wherein the position information is derived by the handheld wireless device from a distance measurement between the handheld wireless device and a plurality of beacons, including at least one fixed-position terrestrial wireless networking device, and wherein the server is configured to remotely control a user interface on the video display in response to the position and orientation information;
   non-transitory computer-readable instructions for displaying, on a display of the handheld device, at least one menu that duplicates information displayed on the video display.

2. The system of claim 1, further comprising a set-top box, in communication with the at least one server, that displays the user interface on the video display and updates the user interface in response to changes in the position and orientation information.

3. The system of claim 2, wherein the at least one server comprises software operating on the set-top box.

4. The system of claim 1, further comprising non-transitory computer-readable instructions that determine motion information relating to the position and orientation information to recognize gestures made by a user.

5. The system of claim 1, further comprising non-transitory computer-readable instructions to allow a processor to recognize at least a subset of the following gestures: Select, Move Up, Move Down, Move Left, Move Right, Back, Forward, Scroll Up, Scroll Down, Scroll Left, Scroll Right, Hover, Stop, Play, Pause, Fast Forward, Rewind, Record, Save, Last, Channel UP, Channel Down, Volume Up, Volume Down, Mute, Hide, Exit, Off, and Help.

6. The system of claim 1, wherein position information is further derived from GPS signals received by the handheld device and the position information corresponds to an indoor location.

7. The system of claim 1, wherein the user interface presents a pointer that moves in response to movement of the handheld device.

8. The system of claim 1, wherein the at least one fixed-position terrestrial wireless networking device comprises at least one of a Wi-Fi access point and a cellular base station.

9. The system of claim 1, wherein the distance measurement is determined by observing a form of radio frequency time of flight or communication time of at least one signal sent to and received from the at least one wireless fixed-position terrestrial networking device.

10. The system of claim 1, wherein the server is further configured to facilitate interaction with a plurality of video displays, and to determine which of the video displays the user interacts with based on the position and orientation information.

11. The system of claim 1, wherein the handheld wireless devices comprises one of a tablet computer and a cell-phone.

12. A system for facilitating remote interaction with an interactive device in a physical space, comprising:
a first set of non-transitory computer-readable instructions for configuring a handheld wireless device to determine position and orientation information about the handheld wireless device based on sensors onboard the handheld wireless device and transmit the position and orientation information and at least one user input across a wireless network, wherein the position information is derived by the handheld wireless device from a distance measurement between the handheld wireless device and at least one fixed-position terrestrial wireless networking device;
a second set of non-transitory computer-readable instructions for configuring at least one processor of a computer, remote from the handheld wireless device, to receive the position and motion information and to approximate the orientation of the handheld wireless device relative to a physical space, including in relation to at least one interactive device based on the position and orientation information received from the handheld device and a model of the environment around the handheld wireless device; and
a third set of non-transitory computer-readable instructions for configuring the at least one processor of the computer to facilitate control of the at least one interactive device in response to the position and orientation information and the at least one user input;
non-transitory computer-readable instructions for displaying, on a display of the handheld device, at least one menu that duplicates information displayed on the video display.

13. The system of claim 12, wherein the interactive device comprises a video display.

14. The system of claim 12, wherein the third set of non-transitory computer-readable instructions are configured to be executed by an automation server and the at least one interactive device comprises at least one of a light switch, an alarm device, and an HVAC device controlled by the automation server.

15. The system of claim 12, wherein the second set of non-transitory computer-readable instructions are configured to be executed by one or more servers in a cloud computing space configured to communicate with the handheld wireless device across the Internet.

16. The system of claim 12, wherein the first set of non-transitory computer-readable instructions comprises instructions for displaying, on a display of the handheld wireless device, selectable actions that can be taken to interact with the at least one interactive device to solicit the at least one user input.

17. The system of claim 16, wherein the selectable actions displayed on the handheld wireless device change depending on which of a plurality of types of interactive devices that the handheld wireless device points to.

18. The system of claim 12, wherein the first set of non-transitory computer-readable instructions comprise instructions to recognize gestures made by the user to determine the at least one user input.

19. The system of claim 12, wherein the at least one other wireless fixed-position terrestrial networking device comprises at least one Wi-Fi access point.

20. The system of claim 19, wherein the distance measurement is determined by observing a form of radio frequency time of flight or communication time from at least one signal sent to and received from the at least one Wi-Fi access point.

21. The system of claim 12, wherein position information is further derived from GPS signals received by the handheld device and the position information includes horizontal and vertical position information.

22. A method for facilitating interaction between a mobile device and an interactive device comprising steps of:
a. observing by a processor on a handheld wireless device, utilizing an antenna and one or more sensors on the handheld wireless device, a plurality of distances relative to a plurality of fixed-position terrestrial network devices in a physical space and an orientation of the handheld wireless device to form the location and orientation information that reflects the position and orientation of the handheld wireless device within the physical space, and transmitting the location and orientation information from the handheld wireless device across at least one network;
b. receiving at a remote server, across the at least one network, the location and orientation information from the handheld wireless device;
c. calculating, by a processor at the remote server, a position and orientation of the handheld wireless device relative to at least one interactive device from the location and orientation information and a model of the physical space to determine that a user is pointing the handheld wireless device relative to the interactive device;

d. determining, by at least one of the processors, at least one command input from a user of the handheld wireless device; and e. transmitting the command to the at least one interactive device across at least one of the at least one networks in response to the step of determining and the position and orientation information;

f. displaying, on a display of the handheld device, at least one menu that duplicates information displayed on the video display.

23. The method of claim 22, wherein the interactive device comprises a video display.

24. The method of claim 22, wherein the at least one interactive device comprises at least one of a light switch, an alarm device, and an HVAC device controlled by an automation server.

25. The method of claim 22, wherein the step of observing further comprises observing a GPS position of the handheld wireless device.

26. The method of claim 22, further comprising a step of calibrating the position of the at least one interactive device by providing computer-readable instructions to allow the handheld wireless device to record a position of at least one portion of the at least one interactive device when the handheld wireless device is placed approximately at the position of the interactive device in the physical space.

27. The method of claim 22, wherein the step of determining at least one command input comprises detecting a motion gesture made by a user of the handheld wireless device.

28. The method of claim 22, wherein the step of determining at least one command input comprises detecting a touch screen input made by a user of the handheld wireless device.

29. The method of claim 22, further comprising a step of displaying a cursor on a video display that indicates approximately where a user is pointing the handheld wireless device.

* * * * *